US011080296B2

(12) United States Patent
Tolnay et al.

(10) Patent No.: US 11,080,296 B2
(45) Date of Patent: *Aug. 3, 2021

(54) DOMAIN-SPECIFIC LANGUAGE FOR DATASET TRANSFORMATIONS

(71) Applicant: Palantir Technologies, Inc., Palo Alto, CA (US)

(72) Inventors: David Tolnay, Palo Alto, CA (US); Punyashloka Biswal, New Haven, CT (US); Andrew Colombi, San Francisco, CA (US); Yupeng Fu, San Jose, CA (US); Ashar Fuadi, Bogor (ID); Mingyu Kim, Palo Alto, CA (US); Paul Nepywoda, Palo Alto, CA (US); Akshay Pundle, Cupertino, CA (US); Juan Tamayo, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 15/913,721

(22) Filed: Mar. 6, 2018

(65) Prior Publication Data

US 2018/0196862 A1    Jul. 12, 2018

Related U.S. Application Data

(63) Continuation of application No. 15/369,753, filed on Dec. 5, 2016, now Pat. No. 9,965,534, which is a (Continued)

(51) Int. Cl.
*G06F 16/20* (2019.01)
*G06F 16/25* (2019.01)
(Continued)

(52) U.S. Cl.
CPC ........ *G06F 16/258* (2019.01); *G06F 16/2282* (2019.01); *G06F 16/23* (2019.01);
(Continued)

(58) Field of Classification Search
None
See application file for complete search history.

(56) References Cited

U.S. PATENT DOCUMENTS

| | | |
|---|---|---|
| 5,109,399 A | 4/1992 | Thompson |
| 5,329,108 A | 7/1994 | Lamoure |

(Continued)

FOREIGN PATENT DOCUMENTS

| | | |
|---|---|---|
| AU | 2014206155 | 12/2015 |
| AU | 2014250678 | 2/2016 |

(Continued)

OTHER PUBLICATIONS

U.S. Appl. No. 14/025,653, filed Sep. 12, 2013, Office Action Interview, dated Oct. 6, 2015.

(Continued)

*Primary Examiner* — Belix M Ortiz Ditren
(74) *Attorney, Agent, or Firm* — Hickman Becker Bingham Ledesma LLP

(57) ABSTRACT

Techniques related to a domain-specific language for transformations are disclosed. A server computer may process a table definition composed in a domain-specific language. The table definition may include a sequence of one or more transformations to be performed on one or more source tables to generate a target table. The sequence may include a customized transformation. A source dataset may be provided as input to an implementation of the customized transformation. An output dataset may be generated as a result of executing the implementation. An intermediate table may be generated based on performing at least one (Continued)

transformation on a particular source table. A supplemental portion for the intermediate table may be generated based on performing the at least one transformation on an appended portion of the particular source table. The target table may be generated based on combining the supplemental portion with the intermediate table.

20 Claims, 9 Drawing Sheets

Related U.S. Application Data continuation of application No. 14/874,690, filed on Oct. 5, 2015, now Pat. No. 9,576,015.

(60) Provisional application No. 62/216,192, filed on Sep. 9, 2015.

(51) Int. Cl.
  G06F 16/23     (2019.01)
  G06F 16/22     (2019.01)
  G06F 16/901    (2019.01)
  G06F 16/2453   (2019.01)

(52) U.S. Cl.
  CPC ...... G06F 16/24539 (2019.01); G06F 16/254 (2019.01); G06F 16/9024 (2019.01); G06F 16/9027 (2019.01)

(56) References Cited

U.S. PATENT DOCUMENTS

| | | | |
|---|---|---|---|
| 5,632,009 A | 5/1997 | Rao et al. | |
| 5,670,987 A | 9/1997 | Doi et al. | |
| 5,781,704 A | 7/1998 | Rossmo | |
| 5,798,769 A | 8/1998 | Chiu et al. | |
| 5,818,737 A | 10/1998 | Orr et al. | |
| 5,845,300 A | 12/1998 | Corner | |
| 6,014,670 A * | 1/2000 | Zamanian | G06F 16/254 |
| 6,057,757 A | 5/2000 | Arrowsmith et al. | |
| 6,091,956 A | 7/2000 | Hollenberg | |
| 6,094,653 A | 7/2000 | Li et al. | |
| 6,161,098 A | 12/2000 | Wallman | |
| 6,167,405 A | 12/2000 | Rosensteel, Jr. et al. | |
| 6,219,053 B1 | 4/2001 | Tachibana et al. | |
| 6,232,971 B1 | 5/2001 | Haynes | |
| 6,247,019 B1 | 6/2001 | Davies | |
| 6,279,018 B1 | 8/2001 | Kudrolli et al. | |
| 6,289,338 B1 | 9/2001 | Stoffel et al. | |
| 6,341,310 B1 | 1/2002 | Leshem et al. | |
| 6,366,933 B1 | 4/2002 | Ball et al. | |
| 6,369,835 B1 | 4/2002 | Lin | |
| 6,430,305 B1 | 8/2002 | Decker | |
| 6,456,997 B1 | 9/2002 | Shukla | |
| 6,463,404 B1 | 10/2002 | Appleby | |
| 6,523,172 B1 | 2/2003 | Martinez-Guerra et al. | |
| 6,539,538 B1 | 3/2003 | Brewster et al. | |
| 6,549,752 B2 | 4/2003 | Tsukamoto | |
| 6,549,944 B1 | 4/2003 | Weinberg et al. | |
| 6,560,620 B1 | 5/2003 | Ching | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,640,231 B1 | 10/2003 | Andersen et al. | |
| 6,642,945 B1 | 11/2003 | Sharpe | |
| 6,643,613 B2 | 11/2003 | McGee et al. | |
| 6,714,936 B1 | 3/2004 | Nevin, III | |
| 6,748,481 B1 | 6/2004 | Parry et al. | |
| 6,775,675 B1 | 8/2004 | Nwabueze et al. | |
| 6,820,135 B1 | 11/2004 | Dingman | |
| 6,828,920 B2 | 12/2004 | Owen et al. | |
| 6,839,745 B1 | 1/2005 | Dingari et al. | |
| 6,877,137 B1 | 4/2005 | Rivette et al. | |
| 6,976,210 B1 | 12/2005 | Silva et al. | |
| 6,978,419 B1 | 12/2005 | Kantrowitz | |
| 6,980,984 B1 | 12/2005 | Huffman et al. | |
| 6,985,950 B1 | 1/2006 | Hanson et al. | |
| 7,027,974 B1 | 4/2006 | Busch et al. | |
| 7,028,223 B1 | 4/2006 | Kolawa et al. | |
| 7,036,085 B2 | 4/2006 | Barros | |
| 7,043,702 B2 | 5/2006 | Chi et al. | |
| 7,055,110 B2 | 5/2006 | Kupka et al. | |
| 7,089,541 B2 | 8/2006 | Ungar | |
| 7,117,430 B2 | 10/2006 | Maguire et al. | |
| 7,139,800 B2 | 11/2006 | Bellotti et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witowski et al. | |
| 7,194,680 B1 | 3/2007 | Roy et al. | |
| 7,237,192 B1 | 6/2007 | Stephenson et al. | |
| 7,240,330 B2 | 7/2007 | Fairweather | |
| 7,269,786 B1 | 9/2007 | Malloy et al. | |
| 7,278,105 B1 | 10/2007 | Kitts | |
| 7,290,698 B2 | 11/2007 | Poslinski et al. | |
| 7,333,998 B2 | 2/2008 | Heckerman et al. | |
| 7,370,047 B2 | 5/2008 | Gorman | |
| 7,379,811 B2 | 5/2008 | Rasmussen et al. | |
| 7,379,903 B2 | 5/2008 | Caballero et al. | |
| 7,426,654 B2 | 9/2008 | Adams et al. | |
| 7,451,397 B2 | 11/2008 | Weber et al. | |
| 7,454,466 B2 | 11/2008 | Bellotti et al. | |
| 7,467,375 B2 | 12/2008 | Tondreau et al. | |
| 7,487,139 B2 | 2/2009 | Fraleigh et al. | |
| 7,502,786 B2 | 3/2009 | Liu et al. | |
| 7,525,422 B2 | 4/2009 | Bishop et al. | |
| 7,529,727 B2 | 5/2009 | Arning et al. | |
| 7,529,734 B2 | 5/2009 | Dirisala | |
| 7,533,069 B2 | 5/2009 | Fairweather | |
| 7,558,677 B2 | 7/2009 | Jones | |
| 7,574,409 B2 | 8/2009 | Patinkin | |
| 7,574,428 B2 | 8/2009 | Leiserowitz et al. | |
| 7,579,965 B2 | 8/2009 | Bucholz | |
| 7,596,285 B2 | 9/2009 | Brown et al. | |
| 7,614,006 B2 | 11/2009 | Molander | |
| 7,617,232 B2 | 11/2009 | Gabbert et al. | |
| 7,620,628 B2 | 11/2009 | Kapur et al. | |
| 7,627,812 B2 | 12/2009 | Chamberlain et al. | |
| 7,634,717 B2 | 12/2009 | Chamberlain et al. | |
| 7,685,083 B2 | 3/2010 | Fairweather | |
| 7,703,021 B1 | 4/2010 | Flam | |
| 7,706,817 B2 | 4/2010 | Bamrah et al. | |
| 7,712,049 B2 | 5/2010 | Williams et al. | |
| 7,716,077 B1 | 5/2010 | Mikurak | |
| 7,725,530 B2 | 5/2010 | Sah et al. | |
| 7,725,547 B2 | 5/2010 | Albertson et al. | |
| 7,730,082 B2 | 6/2010 | Sah et al. | |
| 7,730,109 B2 | 6/2010 | Rohrs et al. | |
| 7,739,246 B2 | 6/2010 | Mooney et al. | |
| 7,756,843 B1 | 7/2010 | Palmer | |
| 7,761,407 B1 | 7/2010 | Stern | |
| 7,770,100 B2 | 8/2010 | Chamberlain et al. | |
| 7,805,457 B1 | 9/2010 | Viola et al. | |
| 7,809,703 B2 | 10/2010 | Balabhadrapatruni et al. | |
| 7,814,084 B2 | 10/2010 | Hallett et al. | |
| 7,818,658 B2 | 10/2010 | Chen | |
| 7,870,493 B2 | 1/2011 | Pall et al. | |
| 7,877,421 B2 | 1/2011 | Berger et al. | |
| 7,894,984 B2 | 2/2011 | Rasmussen et al. | |
| 7,899,611 B2 | 3/2011 | Downs et al. | |
| 7,899,796 B1 | 3/2011 | Borthwick et al. | |
| 7,917,376 B2 | 3/2011 | Bellin et al. | |
| 7,920,963 B2 | 4/2011 | Jouline et al. | |
| 7,933,862 B2 | 4/2011 | Chamberlain et al. | |
| 7,941,321 B2 | 5/2011 | Greenstein et al. | |
| 7,962,281 B2 | 6/2011 | Rasmussen et al. | |
| 7,962,495 B2 | 6/2011 | Jain et al. | |
| 7,962,848 B2 | 6/2011 | Bertram | |
| 7,970,240 B1 | 6/2011 | Chao et al. | |
| 7,971,150 B2 | 6/2011 | Raskutti et al. | |
| 7,984,374 B2 | 7/2011 | Caro et al. | |
| 8,001,465 B2 | 8/2011 | Kudrolli et al. | |

(56) References Cited

U.S. PATENT DOCUMENTS

| | | |
|---|---|---|
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,117,022 B2 | 2/2012 | Linker |
| 8,132,149 B2 | 3/2012 | Shenfield et al. |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,271,948 B2 | 9/2012 | Talozi et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,332,354 B1 | 12/2012 | Chatterjee et al. |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,418,085 B2 | 4/2013 | Snook et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,494 B1 | 10/2013 | Downing |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,601,326 B1 | 12/2013 | Kirn |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,688,573 B1 | 4/2014 | Ruknoic et al. |
| 8,689,108 B1 | 4/2014 | Duffield et al. |
| 8,689,182 B2 | 4/2014 | Leithead et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,799,867 B1 | 8/2014 | Peri-Glass et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,838,556 B1 | 9/2014 | Reiner et al. |
| 8,855,999 B1 | 10/2014 | Elliot |
| 8,868,537 B1 | 10/2014 | Colgrove et al. |
| 8,903,717 B2 | 12/2014 | Elliot |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,897 B2 | 1/2015 | Nassar |
| 8,937,619 B2 | 1/2015 | Sharma et al. |
| 8,938,434 B2 | 1/2015 | Jain et al. |
| 8,938,686 B1 | 1/2015 | Erenrich et al. |
| 8,949,164 B1 | 2/2015 | Mohler |
| 8,954,410 B2 | 2/2015 | Chang et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,092,482 B2 | 7/2015 | Harris et al. |
| 9,100,428 B1 | 8/2015 | Visbal |
| 9,116,975 B2 | 8/2015 | Shankar et al. |
| 9,129,219 B1 | 9/2015 | Robertson et al. |
| 9,146,954 B1 | 9/2015 | Boe et al. |
| 9,201,920 B2 | 12/2015 | Jain et al. |
| 9,208,159 B2 | 12/2015 | Stowe et al. |
| 9,223,773 B2 | 12/2015 | Isaacson |
| 9,229,952 B1 * | 1/2016 | Meacham ............ G06F 16/219 |
| 9,230,060 B2 | 1/2016 | Friedlander et al. |
| 9,230,280 B1 | 1/2016 | Maag et al. |
| 9,280,532 B2 | 3/2016 | Cicerone |
| 9,576,015 B1 | 2/2017 | Tolnay et al. |
| 9,946,738 B2 | 4/2018 | Meacham et al. |
| 2001/0056522 A1 | 12/2001 | Satyanarayana |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194058 A1 | 12/2002 | Eldering |
| 2002/0194119 A1 | 12/2002 | Wright et al. |
| 2003/0028560 A1 | 2/2003 | Kudrolli et al. |
| 2003/0036848 A1 | 2/2003 | Sheha et al. |
| 2003/0039948 A1 | 2/2003 | Donahue et al. |
| 2003/0074187 A1 | 4/2003 | Ait-Mokhtar et al. |
| 2003/0088438 A1 | 5/2003 | Maughan et al. |
| 2003/0126102 A1 | 7/2003 | Borthwick |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0171942 A1 | 9/2003 | Gaito |
| 2003/0172053 A1 | 9/2003 | Fairweather |
| 2003/0177112 A1 | 9/2003 | Gardner |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044992 A1 | 3/2004 | Muller et al. |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0095349 A1 | 5/2004 | Bito et al. |
| 2004/0103124 A1 | 5/2004 | Kupkova |
| 2004/0111410 A1 | 6/2004 | Burgoon et al. |
| 2004/0111480 A1 | 6/2004 | Yue |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |

(56) References Cited

U.S. PATENT DOCUMENTS

| | | |
|---|---|---|
| 2004/0153418 A1 | 8/2004 | Hanweck |
| 2004/0153837 A1 | 8/2004 | Preston et al. |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0091420 A1 | 4/2005 | Snover et al. |
| 2005/0102328 A1 | 5/2005 | Ring et al. |
| 2005/0125715 A1 | 6/2005 | Di Franco et al. |
| 2005/0143602 A1 | 6/2005 | Yada et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0095521 A1 | 5/2006 | Patinkin |
| 2006/0106847 A1 | 5/2006 | Eckardt et al. |
| 2006/0129746 A1 | 6/2006 | Porter |
| 2006/0129992 A1 | 6/2006 | Oberholtzer et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0161558 A1 | 7/2006 | Tamma et al. |
| 2006/0184889 A1 | 8/2006 | Molander |
| 2006/0203337 A1 | 9/2006 | White |
| 2006/0209085 A1 | 9/2006 | Wong et al. |
| 2006/0218405 A1 | 9/2006 | Ama et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0271838 A1 | 11/2006 | Carro |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0074169 A1 | 3/2007 | Chess et al. |
| 2007/0078832 A1 | 4/2007 | Ott et al. |
| 2007/0078872 A1 | 4/2007 | Cohen |
| 2007/0083541 A1 | 4/2007 | Fraleigh et al. |
| 2007/0094389 A1 | 4/2007 | Nussey et al. |
| 2007/0112714 A1 | 5/2007 | Fairweather |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0034327 A1 | 2/2008 | Cisler et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0103996 A1 | 5/2008 | Forman et al. |
| 2008/0104019 A1 | 5/2008 | Nath |
| 2008/0104060 A1 | 5/2008 | Abhyankar et al. |
| 2008/0104407 A1 | 5/2008 | Horne et al. |
| 2008/0126951 A1 | 5/2008 | Sood et al. |
| 2008/0140387 A1 | 6/2008 | Linker |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0037417 A1 | 2/2009 | Shankar et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0199047 A1 | 8/2009 | Vaitheeswaran et al. |
| 2009/0222400 A1 | 9/2009 | Kupershmidt et al. |
| 2009/0222760 A1 | 9/2009 | Halverson et al. |
| 2009/0228507 A1 | 9/2009 | Jain et al. |

(56) References Cited

U.S. PATENT DOCUMENTS

| | | |
|---|---|---|
| 2009/0234720 A1 | 9/2009 | George et al. |
| 2009/0240664 A1 | 9/2009 | Dinker et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0281839 A1 | 11/2009 | Lynn et al. |
| 2009/0282097 A1 | 11/2009 | Alberti et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0310816 A1 | 12/2009 | Freire et al. |
| 2009/0313463 A1 | 12/2009 | Pang et al. |
| 2009/0319418 A1 | 12/2009 | Herz |
| 2009/0319891 A1 | 12/2009 | MacKinlay |
| 2009/0327208 A1 * | 12/2009 | Bittner .............. G06F 16/24564 706/61 |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0082532 A1 | 4/2010 | Shaik et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114629 A1 | 5/2010 | Adler et al. |
| 2010/0114887 A1 | 5/2010 | Conway et al. |
| 2010/0122152 A1 | 5/2010 | Chamberlain et al. |
| 2010/0125470 A1 | 5/2010 | Chisholm |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0204983 A1 | 8/2010 | Chung et al. |
| 2010/0211550 A1 | 8/2010 | Daniello et al. |
| 2010/0228786 A1 | 9/2010 | Torok |
| 2010/0228812 A1 | 9/2010 | Uomini |
| 2010/0235915 A1 | 9/2010 | Memon et al. |
| 2010/0250412 A1 | 9/2010 | Wagner |
| 2010/0257015 A1 | 10/2010 | Molander |
| 2010/0257515 A1 | 10/2010 | Bates et al. |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0153592 A1 | 6/2011 | Demarcken |
| 2011/0161096 A1 | 6/2011 | Buehler et al. |
| 2011/0161132 A1 | 6/2011 | Goel et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0181598 A1 | 7/2011 | O'Neall et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0213791 A1 | 9/2011 | Jain et al. |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0295795 A1 | 12/2011 | Venkatasubramanian et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |

(56) References Cited

U.S. PATENT DOCUMENTS

| | | |
|---|---|---|
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290527 A1 | 11/2012 | Yalamanchilli |
| 2012/0290879 A1 | 11/2012 | Shibuya et al. |
| 2012/0296907 A1 | 11/2012 | Long et al. |
| 2012/0304150 A1 | 11/2012 | Leithead et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0006947 A1 | 1/2013 | Akinyemi et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024731 A1 | 1/2013 | Shochat et al. |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0057551 A1 | 3/2013 | Ebert et al. |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0091084 A1 | 4/2013 | Lee |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0124193 A1 | 5/2013 | Holmberg |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0198565 A1 | 8/2013 | Mancoridis et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226879 A1 | 8/2013 | Talukder et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0246316 A1 | 9/2013 | Zhao et al. |
| 2013/0246537 A1 | 9/2013 | Gaddala |
| 2013/0246560 A1 | 9/2013 | Feng et al. |
| 2013/0246597 A1 | 9/2013 | Iizawa et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0275446 A1 | 10/2013 | Jain et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2014/0012796 A1 | 1/2014 | Petersen et al. |
| 2014/0019423 A1 | 1/2014 | Leinsberger et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0156617 A1 | 6/2014 | Tomkins |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0279979 A1 | 9/2014 | Yost et al. |
| 2014/0310266 A1 | 10/2014 | Greenfield |
| 2014/0316911 A1 | 10/2014 | Gross |
| 2014/0324876 A1 | 10/2014 | Konik et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0019394 A1 | 1/2015 | Unser et al. |
| 2015/0039886 A1 | 2/2015 | Kahol et al. |
| 2015/0046481 A1 | 2/2015 | Elliot |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100559 A1 | 4/2015 | Nassar |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112641 A1 | 4/2015 | Faraj |
| 2015/0134666 A1 | 5/2015 | Gattiker et al. |
| 2015/0135256 A1 | 5/2015 | Hoy et al. |
| 2015/0142766 A1 | 5/2015 | Jain et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188715 A1 | 7/2015 | Castelluci et al. |
| 2015/0188872 A1 | 7/2015 | White |

(56) References Cited

U.S. PATENT DOCUMENTS

| | | | |
|---|---|---|---|
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0242397 A1 | 8/2015 | Zhuang |
| 2015/0261817 A1 | 9/2015 | Harris et al. |
| 2015/0261847 A1 | 9/2015 | Ducott et al. |
| 2015/0324868 A1 | 11/2015 | Kaftan et al. |
| 2015/0338233 A1 | 11/2015 | Cervelli et al. |
| 2015/0341467 A1 | 11/2015 | Lim et al. |
| 2015/0347903 A1 | 12/2015 | Saxena et al. |
| 2015/0378996 A1 | 12/2015 | Kesin et al. |
| 2015/0379413 A1 | 12/2015 | Robertson et al. |
| 2016/0004667 A1 | 1/2016 | Chakerian et al. |
| 2016/0004764 A1 | 1/2016 | Chakerian et al. |
| 2016/0034545 A1 | 2/2016 | Shankar et al. |
| 2016/0062555 A1 | 3/2016 | Ward et al. |
| 2016/0098173 A1 | 4/2016 | Slawinski et al. |
| 2016/0147730 A1 | 5/2016 | Cicerone |
| 2017/0039253 A1 | 2/2017 | Bond |
| 2017/0068698 A1 | 3/2017 | Tolnay et al. |
| 2017/0083595 A1 | 3/2017 | Tolnay et al. |
| 2017/0097950 A1 | 4/2017 | Meacham et al. |

FOREIGN PATENT DOCUMENTS

| | | |
|---|---|---|
| CA | 2666364 | 1/2015 |
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014204840 | 9/2014 |
| DE | 102014213036 | 1/2015 |
| DE | 102014215621 | 2/2015 |
| EP | 0652513 | 5/1995 |
| EP | 1566758 | 8/2005 |
| EP | 1672527 | 6/2006 |
| EP | 1962222 | 8/2008 |
| EP | 2221725 | 8/2010 |
| EP | 2487610 | 8/2012 |
| EP | 2551799 | 1/2013 |
| EP | 2560134 | 2/2013 |
| EP | 2778913 | 9/2014 |
| EP | 2778914 | 9/2014 |
| EP | 2778977 | 9/2014 |
| EP | 2778986 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2897051 | 7/2015 |
| EP | 2911078 | 8/2015 |
| EP | 2963595 | 1/2016 |
| EP | 2993595 | 3/2016 |
| EP | 3018553 | 5/2016 |
| EP | 3128447 | 2/2017 |
| EP | 3142027 | 3/2017 |
| GB | 2366498 | 3/2002 |
| GB | 2513007 | 10/2014 |
| GB | 2516155 | 1/2015 |
| GB | 2517582 | 2/2015 |
| GB | 2518745 | 4/2015 |
| NL | 2012778 | 11/2014 |
| NL | 2013134 | 1/2015 |
| NL | 2013306 | 2/2015 |
| NL | 2011642 | 8/2015 |
| NZ | 624557 | 12/2014 |
| WO | WO 2000/009529 | 2/2000 |
| WO | WO 2002/035376 | 5/2002 |
| WO | WO 2002/065353 | 8/2002 |
| WO | WO 2003/060751 | 7/2003 |
| WO | WO 2005/010685 | 2/2005 |
| WO | WO 2005/104736 | 11/2005 |
| WO | WO 2005/116851 | 12/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/098958 | 9/2010 |
| WO | WO 2011/017289 | 5/2011 |
| WO | WO 2011/071833 | 6/2011 |
| WO | WO 2012/025915 | 3/2012 |
| WO | WO 2012/079836 | 6/2012 |
| WO | WO 2013/010157 | 1/2013 |
| WO | WO 2013/067077 | 5/2013 |
| WO | WO 2013/102892 | 7/2013 |

OTHER PUBLICATIONS

U.S. Appl. No. 14/134,558, filed Dec. 19, 2013, Office Action, dated Oct. 7, 2015.

U.S. Appl. No. 13/831,791, filed Mar. 15, 2013, Office Action, dated Mar. 4, 2015.

U.S. Appl. No. 14/025,653, filed Sep. 12, 2013, Interview Summary, dated Mar. 3, 2016.

U.S. Appl. No. 13/839,026, filed Mar. 15, 2013, Restriction Requirement, dated Apr. 2, 2015.

U.S. Appl. No. 13/827,491, filed Mar. 14, 2013, Office Action, dated Oct. 9, 2015.

U.S. Appl. No. 14/319,765, filed Jun. 30, 2014, Advisory Action, dated Sep. 10, 2015.

U.S. Appl. No. 14/306,147, filed Jun. 16, 2014, Final Office Action, dated Feb. 19, 2015.

U.S. Appl. No. 14/225,006, filed Mar. 25, 2014, First Office Action, dated Feb. 27, 2015.

U.S. Appl. No. 14/306,154, filed Jun. 16, 2014, Advisory Action, dated May 15, 2015.

U.S. Appl. No. 14/451,221, filed Aug. 4, 2014, Office Action, dated Oct. 21, 2014.

U.S. Appl. No. 14/306,138, filed Jun. 16, 2014, Office Action, dated May 26, 2015.

U.S. Appl. No. 14/225,160, filed Mar. 25, 2014, Final Office Action, dated Feb. 11, 2015.

U.S. Appl. No. 14/473,552, filed Aug. 29, 2014, Notice of Allowance, dated Jul. 24, 2015.

U.S. Appl. No. 14/874,690, filed Oct. 5, 2015, First Action Interview, dated Dec. 21, 2015.

U.S. Appl. No. 14/877,229, filed Oct. 7, 2015, Office Action, dated Mar. 22, 2016.

U.S. Appl. No. 14/533,433, filed Nov. 5, 2014, Notice of Allowance, dated Sep. 1, 2015.

U.S. Appl. No. 14/508,696, filed Oct. 7, 2014, Office Action, dated Mar. 2, 2015.

U.S. Appl. No. 14/148,568, filed Jan. 6, 2014, Office Action, dated Mar. 26, 2015.

U.S. Appl. No. 13/196,788, filed Aug. 2, 2011, Interview Summary, dated Nov. 25, 2015.

U.S. Appl. No. 14/225,160, filed Mar. 25, 2014, First Office Action Interview, dated Jul. 29, 2014.

U.S. Appl. No. 15/504,103, filed Oct. 1, 2014, First Office Action Interview, dated Feb. 5, 2015.

U.S. Appl. No. 14/533,433, filed Nov. 5, 2014, Office Action, dated Feb. 26, 2015.

U.S. Appl. No. 14/306,147, filed Jun. 16, 2014, First Office Action Interview, dated Sep. 9, 2014.

(56) References Cited

OTHER PUBLICATIONS

U.S. Appl. No. 14/639,606, filed Mar. 5, 2015, First Office Action Interview, dated Jul. 24, 2015.
U.S. Appl. No. 14/319,765, filed Jun. 30, 2014, Notice of Allowance, dated Nov. 25, 2014.
U.S. Appl. No. 14/571,098, filed Dec. 15, 2014, First Office Action Interview, dated Aug. 5, 2015.
U.S. Appl. No. 14/323,935, filed Jul. 3, 2014, Office Action, dated Jun. 22, 2015.
U.S. Appl. No. 14/616,080, filed Feb. 6, 2015, Notice of Allowance, dated Apr. 2, 2015.
U.S. Appl. No. 14/225,006, filed Mar. 25, 2014, First Office Action Interview, dated Sep. 10, 2014.
U.S. Appl. No. 14/306,147, filed Jun. 16, 2014, Office Action, dated Aug. 7, 2015.
U.S. Appl. No. 14/879,916, filed Oct. 9, 2015, Notice of Allowance, dated Jun. 22, 2016.
U.S. Appl. No. 14/948,009, filed Nov. 20, 2015, Notice of Allowance, dated May 6, 2016.
U.S. Appl. No. 14/225,084, filed Mar. 25, 2014, First Office Action Interview, dated Sep. 2, 2014.
U.S. Appl. No. 14/486,991, filed Sep. 15, 2014, Notice of Allowance, dated May 1, 2015.
U.S. Appl. No. 14/196,814, filed Mar. 4, 2014, Office Action, dated May 5, 2015.
U.S. Appl. No. 14/225,084, filed Mar. 25, 2014, Office Action, dated Sep. 11, 2015.
U.S. Appl. No. 14/483,527, filed Sep. 11, 204, First Office Action Interview, dated Jan. 28, 2015.
U.S. Appl. No. 12/556,318, filed Jun. 16, 2014, Office Action, dated Jul. 2, 2015.
U.S. Appl. No. 14/526,066, filed Mar. 25, 2014, Final Office Action, dated May 6, 2016.
U.S. Appl. No. 14/326,738, filed Jul. 9, 2014, First Office Action Interview, dated Mar. 31, 2015.
U.S. Appl. No. 14/306,154, filed Jun. 16, 2014, Final Office Action, dated Mar. 11, 2015.
U.S. Appl. No. 14/268,964, filed May 2, 2014, First Office Action Interview, dated Sep. 3, 2014.
U.S. Appl. No. 13/922,437, filed Jun. 20, 2013, Notice of Allowance, dated Jul. 3, 2014.
U.S. Appl. No. 13/835,688, filed Mar. 15, 2013, First Office Action Interview, dated Jun. 17, 2015.
U.S. Appl. No. 14/746,671, filed Jun. 22, 2015, First Office Action Interview, dated Nov. 12, 2015.
U.S. Appl. No. 14/323,935, filed Jul. 3, 2014, First Office Action Interview, dated Nov. 28, 2014.
U.S. Appl. No. 14/319,765, filed Jun. 30, 2014, First Office Action Interview, dated Feb. 4, 2015.
U.S. Appl. No. 14/294,098, filed Jun. 2, 2014, Final Office Action, dated Nov. 6, 2014.
U.S. Appl. No. 14/225,084, filed Mar. 25, 2014, Notice of Allowance, dated May 4, 2015.
U.S. Appl. No. 14/134,558, filed Dec. 19, 2013, Final Office Action, dated May 16, 2016.
U.S. Appl. No. 14/278,963, filed May 15, 2014, Notice of Allowance, dated Sep. 2, 2015.
U.S. Appl. No. 14/579,752, filed Dec. 22, 2014, First Office Action Interview, dated May 26, 2015.
U.S. Appl. No. 13/827,491, filed Mar. 14, 2013, Office Action, dated Dec. 1, 2014.
U.S. Appl. No. 14/225,160, filed Mar. 25, 2014, Office Action, dated Aug. 12, 2015.
U.S. Appl. No. 14/225,084, filed Mar. 25, 2014, Interview Summary, dated Jan. 4, 2016.
U.S. Appl. No. 14/734,772, filed Jun. 9, 2015, First Office Action Interview, dated Oct. 30, 2015.
U.S. Appl. No. 14/094,418, filed Dec. 2, 2013, Notice of Allowance, dated Jan. 25, 2016.
U.S. Appl. No. 14/225,084, filed Mar. 25, 2014, First Office Action Interview, dated Feb. 20, 2015.
U.S. Appl. No. 14/562,524, filed Dec. 5, 2014, First Office Action Interview, dated Sep. 14, 2015.
U.S. Appl. No. 14/473,860, filed Aug. 29, 2014, Notice of Allowance, dated Jan. 5, 2015.
U.S. Appl. No. 14/842,734, filed Sep. 1, 2015, First Office Action Interview, dated Nov. 19, 2015.
U.S. Appl. No. 14/294,098, filed Jun. 2, 2014, First Office Action Interview, dated Aug. 15, 2014.
U.S. Appl. No. 13/196,788, filed Aug. 2, 2011, Notice of Allowance, dated Dec. 18, 2015.
U.S. Appl. No. 14/473,552, filed Aug. 29, 2014, Interview Summary, dated Feb. 24, 2015.
U.S. Appl. No. 14/326,738, filed Jul. 9, 2014, First Office Action Interview, dated Dec. 2, 2014.
U.S. Appl. No. 14/562,524, filed Dec. 5, 2014, First Office Action Interview, dated Nov. 10, 2015.
U.S. Appl. No. 14/225,006, filed Mar. 25, 2014, First Office Action Interview, dated Feb. 27, 2015.
U.S. Appl. No. 14/874,690, filed Oct. 5, 2015, Office Action, dated Jun. 1, 2016.
U.S. Appl. No. 14/849,545, filed Sep. 9, 2015, Office Action, dated Jan. 29, 2016.
U.S. Appl. No. 14/813,749, filed Jul. 30, 2015, Office Action, dated Sep. 28, 2015.
U.S. Appl. No. 14/504,103, filed Oct. 1, 2014, Notice of Allowance, dated May 18, 2015.
U.S. Appl. No. 14/326,738, filed Jul. 9, 2014, Notice of Allowance, dated Nov. 18, 2015.
U.S. Appl. No. 14/579,752, filed Dec. 22, 2014, Final Office Action, dated Aug. 19, 2015.
U.S. Appl. No. 14/580,218, filed Dec. 23, 2014, Office Action, dated Jun. 7, 2016.
U.S. Appl. No. 14/996,179, filed Jan. 14, 2016, First Office Action Interview, dated May 20, 2016.
U.S. Appl. No. 14/306,154, filed Jun. 16, 201, Office Action, dated Mar. 17, 2016.
U.S. Appl. No. 14/225,160, filed Mar. 25, 2014, Final Office, dated Feb. 11, 2015.
U.S. Appl. No. 14/504,103, filed Oct. 1, 2014, Notice of Allowance, dated Sep. 9, 2014.
U.S. Appl. No. 13/247,987, filed Sep. 28, 2011, Notice of Allowance, dated Mar. 17, 2016.
U.S. Appl. No. 14/849,454, filed Sep. 9, 2015, Interview Summary, dated Feb. 24, 2016.
U.S. Appl. No. 14/490,612, filed Sep. 18, 2014, First Office Action Interview, dated Jan. 27, 2015.
U.S. Appl. No. 14/961,830, filed Dec. 7, 2015, Office Action, dated May 20, 2016.
U.S. Appl. No. 14/319,161, filed Jun. 30, 2014, Office Action, dated Sep. 25, 2014.
U.S. Appl. No. 14/676,621, filed Apr. 1, 2015, Final Office Action, dated Oct. 29, 2015.
U.S. Appl. No. 14/746,671, filed Jun. 22, 2015, Notice of Allowance, dated Jan. 21, 2016.
U.S. Appl. No. 14/306,154, filed Jun. 16, 2014, Final Office Action, dated Nov. 16, 2015.
U.S. Appl. No. 14/746,671, filed Jun. 22, 2015, First Office Action Interview, dated Sep. 28, 2015.
U.S. Appl. No. 13/247,987, filed Sep. 28, 2011, Office Action, dated Apr. 2, 2015.
U.S. Appl. No. 14/849,454, filed Sep. 9, 2015, Notice of Allowance, dated Nov. 3, 2015.
U.S. Appl. No. 14/552,336, filed Nov. 24, 2014, Notice of Allowance, dated Nov. 3, 2015.
U.S. Appl. No. 14/639,606, filed Mar. 5, 2015, First Office Action Interview, dated May 18, 2015.
U.S. Appl. No. 14/306,138, filed Jun. 16, 2014, First Office Action Interview, dated Sep. 23, 2015.
U.S. Appl. No. 14/463,615, filed Aug. 19, 2014, Advisory Action, dated Sep. 10, 2015.

(56) References Cited

OTHER PUBLICATIONS

U.S. Appl. No. 14/225,160, filed Mar. 25, 2014, First Office Action Interview, dated Oct. 22, 2014.
U.S. Appl. No. 14/225,160, filed Mar. 25, 2014, Advisory Action, dated May 20, 2015.
U.S. Appl. No. 14/508,696, filed Oct. 7, 2014, Notice of Allowance, dated Jul. 27, 2015.
U.S. Appl. No. 14/223,918, filed Mar. 24, 2014, Notice of Allowance, dated Jan. 6, 2016.
U.S. Appl. No. 14/486,991, filed Sep. 15, 2014, Office Action, dated Mar. 10, 2015.
U.S. Appl. No. 14/526,066, filed Oct. 28, 2014, Office Action, dated Jan. 21, 2016.
U.S. Appl. No. 13/839,026, filed Mar. 15, 2013, Office Action, dated Aug. 4, 2015.
U.S. Appl. No. 14/504,103, filed Oct. 1, 2014, First Office Action Interview, dated Mar. 31, 2015.
U.S. Appl. No. 14/726,211, filed May 29, 2015, Office Action, dated Apr. 2, 2016.
U.S. Appl. No. 14/306,138, filed Jun. 16, 2014, Office Action, dated Mar. 17, 2016.
U.S. Appl. No. 14/319,765, filed Jun. 30, 2014, Final Office Action, dated Jun. 16, 2015.
U.S. Appl. No. 14/323,935, filed Jul. 3, 2014, First Office Action Interview, dated Mar. 31, 2015.
U.S. Appl. No. 14/148,568, filed Jan. 6, 2014, Notice of Allowance, dated Aug. 26, 2015.
U.S. Appl. No. 14/879,916, filed Oct. 9, 2015, First Office Action Interview, dated Apr. 15, 2016.
U.S. Appl. No. 14/954,680, filed Nov. 30, 2015, Office Action, dated May 12, 2016.
U.S. Appl. No. 14/289,596, filed May 28, 2014, Advisory Action, dated Apr. 30, 2015.
U.S. Appl. No. 14/289,596, filed May 28, 2014, Final Office Action, dated Jan. 26, 2015.
U.S. Appl. No. 14/571,098, filed Dec. 15, 2014, First Office Action Interview, dated Nov. 10, 2015.
U.S. Appl. No. 14/463,615, filed Aug. 19, 2014, Final Office Action, dated May 21, 2015.
U.S. Appl. No. 14/631,633, filed Feb. 25, 2015, First Office Action Interview, dated Sep. 10, 2015.
U.S. Appl. No. 14/800.447, filed Jul. 15, 2012, First Office Action Interview, dated Dec. 10, 2010.
U.S. Appl. No. 14/141,252, filed Dec. 26, 2013, Office Action, dated Oct. 8, 2015.
U.S. Appl. No. 14/102,394, filed Dec. 10, 2013, Notice of Allowance, dated Aug. 25, 2014.
U.S. Appl. No. 14/044,800, filed Oct. 2, 2013, Notice of Allowance, dated Sep. 2, 2014.
U.S. Appl. No. 15/187,715, filed Oct. 6, 2016, Office Action, dated Aug. 16, 2017.
U.S. Appl. No. 14/948,009, filed Nov. 20, 2015, First Action Interview, dated Feb. 25, 2016.
U.S. Appl. No. 14/645,304, filed Mar. 11, 2015, Office Action, dated Jan. 25, 2016.
U.S. Appl. No. 14/294,098, filed Jun. 2, 2014, Notice of Allowance, dated Dec. 24, 2015.
U.S. Appl. No. 14/306,147, filed Jun. 16, 2014, Final Office Action, dated Dec. 24, 2015.
U.S. Appl. No. 14/479,863, filed Sep. 8, 2014, First Office Action Interview, dated Dec. 26, 2014.
U.S. Appl. No. 14/289,599, filed May 28, 2014, First Office Action Interview, dated Jul. 22, 2014.
U.S. Appl. No. 14/463,615, filed Aug. 19, 2014, First Office Action Interview, dated Nov. 13, 2014.
U.S. Appl. No. 14/148,568, filed Jan. 6, 2014, Final Office Action, dated Oct. 22, 2014.
U.S. Appl. No. 14/483,527, filed Sep. 11, 2014, Final Office Action, dated Jun. 22, 2015.
U.S. Appl. No. 13/557,100, filed Jul. 24, 2012, Final Office Action, dated Apr. 7, 2016.
U.S. Appl. No. 14/841,338, filed Aug. 31, 2015, Office Action, dated Feb. 18, 2016.
U.S. Appl. No. 14/306,138, filed Jun. 16, 2014, Final Office Action, dated Sep. 14, 2015.
U.S. Appl. No. 14/225,006, filed Mar. 25, 2014, Advisory Action, dated Dec. 21, 2015.
U.S. Appl. No. 14/479,863, filed Sep. 8, 2014, Notice of Allowance, dated Mar. 31, 2015.
U.S. Appl. No. 14/289,596, filed May 28, 2014, First Office Action Interview, dated Jul. 18, 2014.
U.S. Appl. No. 14/192,767, filed Feb. 27, 2014, Notice of Allowance, dated Dec. 16, 2014.
U.S. Appl. No. 14/319,161, filed Jun. 30, 2014, Notice of Allowance, dated May 4, 2015.
U.S. Appl. No. 14/306,138, filed Jun. 16, 2014, Interview Summary, dated Dec. 3, 2015.
U.S. Appl. No. 14/306,154, filed Jun. 16, 2014, Office Action, dated Jul. 6, 2015.
U.S. Appl. No. 14/571,098, filed Dec. 15, 2014, First Office Action Interview, dated Mar. 11, 2015.
U.S. Appl. No. 14/323,935, filed Jul. 30, 2014, Notice of Allowance, dated Oct. 1, 2015.
U.S. Appl. No. 14/108,187, filed Dec. 16, 2013, Notice of Allowance, dated Aug. 29, 2014.
U.S. Appl. No. 14/734,772, filed Jun. 9, 2015, Notice of Allowance, dated Apr. 27, 2016.
U.S. Appl. No. 14/268,964, filed May 2, 2014, Notice of Allowance, dated Dec. 3, 2014.
U.S. Appl. No. 14/306,138, filed Jun. 16, 2014, Final Office Action, dated Feb. 18, 2015.
U.S. Appl. No. 14/578,389, filed Dec. 20, 2014, Office Action, dated Oct. 21, 2015.
U.S. Appl. No. 14/552,336, filed Nov. 24, 2014, First Office Action Interview, dated Jul. 20, 2015.
U.S. Appl. No. 14/571,098, filed Dec. 15, 2014, First Office Action Interview, dated Aug. 24, 2015.
U.S. Appl. No. 13/196,788, filed Aug. 2, 2011, Office Action, dated Oct. 23, 2015.
U.S. Appl. No. 14/631,633, filed Feb. 25, 2015, First Office Action Interview, dated Feb. 3, 2016.
U.S. Appl. No. 14/463,615, filed Aug. 19, 2014, First Office Action Interview, dated Jan. 28, 2015.
U.S. Appl. No. 14/306,154, filed Jun. 16, 2014, First Office Action Interview, dated Sep. 9, 2014.
U.S. Appl. No. 13/827,491, filed Mar. 14, 2013, Final Office Action, dated Jun. 22, 2015.
U.S. Appl. No. 14/319,161, filed Jun. 30, 2014, Final Office Action, dated Jan. 23, 2015.
U.S. Appl. No. 14/676,621, filed Apr. 1, 2015, First Office Action Interview, dated Jul. 30, 2015.
U.S. Appl. No. 14/578,389, filed Dec. 20, 2014, Office Action, dated Apr. 22, 2016.
U.S. Appl. No. 14/319,765, filed Jun. 30, 2014, Office Action, dated Feb. 1, 2016.
U.S. Appl. No. 14/306,138, filed Jun. 16, 2014, Interview Summary, dated Dec. 24, 2015.
U.S. Appl. No. 14/483,527, filed Sep. 11, 204, Office Action, dated Oct. 28, 2015.
U.S. Appl. No. 14/874,690, filed Oct. 5, 2015, Notice of Allowance, dated Oct. 5, 2016.
U.S. Appl. No. 14/504,103, dated Oct. 1, 2014, First Office Action Interview, dated Feb. 5, 2015.
U.S. Appl. No. 14/326,738, filed Jul. 9, 2014, Final Office Action, dated Jul. 31, 2015.
U.S. Appl. No. 14/225,006, filed Mar. 25, 2014, Final Office Action, dated Sep. 2, 2015.
U.S. Appl. No. 14/135,289, filed Dec. 19, 2013, Notice of Allowance, dated Oct. 14, 2014.
U.S. Appl. No. 14/816,264, filed Aug. 3, 2015, First Office Action Interview, dated Oct. 19, 2017.

(56) References Cited

OTHER PUBLICATIONS

U.S. Appl. No. 14/816,264, filed Aug. 3, 2015, Notice of Allowance, dated Jan. 30, 2018.
Official Communication for European Patent Application No. 14159629.6 dated Jul. 31, 2014.
Official Communication for Australian Patent Application No. 2014201580 dated Feb. 27, 2015.
Sirotkin et al., "Chapter 13: The Processing of Biological Sequence Data at NCBI," The NCBI Handbook, Oct. 2002, pp. 1-11.
Official Communication for New Zealand Patent Application No. 622414 dated Mar. 24, 2014.
Delcher et al., "Identifying Bacterial Genes and Endosymbiont DNA with Glimmer," BioInformatics, vol. 23, No. 6, 2007, pp. 673-679.
Madden, Tom, "Chapter 16: The BLAST Sequence Analysis Tool," The NCBI Handbook, Oct. 2002, pp. 1-15.
Kahan et al., "Annotea: an Open RDF Infrastructure for Shared Web Annotations", Computer Networks, Elsevier Science Publishers B.V., vol. 39, No. 5, dated Aug. 5, 2002.
Mizrachi, Ilene, "Chapter 1: Gen Bank: the Nuckeotide Sequence Database," The NCBI Handbook, Oct. 2002, pp. 1-14.
"A Tour of Pinboard," <http://pinboard.In/tour> as printed May 15, 2014 in 6 pages.
Official Communication for Great Britain Patent Application No. 1404574.4 dated Dec. 18, 2014.
Official Communication for New Zealand Patent Application No. 622484 dated Apr. 2, 2014.
Kitts, Paul, "Chapter 14: Genome Assembly and Annotation Process," The NCBI Handbook, Oct. 2002, pp. 1-21.
"A Quick Guide to UniProtKB Swiss-Prot & TrEMBL," Sep. 2011, pp. 2.
"The FASTA Program Package," fasta-36.3.4, Mar. 25, 2011, pp. 29.
Wollrath et al., "A Distributed Object Model for the Java System," Proceedings of the 2nd Conference on USENEX, Conference on Object-Oriented Technologies (COOTS), 17.
Official Communication for European Patent Application No. 14180321.3 dated Apr. 17, 2015.
Official Communication for Australian Patent Application No. 2014202442 dated Mar. 19, 2015.
Official Communication for European Patent Application No. 14187996.5 dated Feb. 12, 2015.
Official Communication for New Zealand Patent Application No. 628263 dated Aug. 12, 2014.
Palantir, "Extracting and Transforming Data with Kite," Palantir Technologies, Inc., Copyright 2010, pp. 38.
Palermo, Christopher J., "Memorandum," [Disclosure relating to U.S. Appl. No. 13/916,447, filed Jun. 12, 2013, and related applications], Jan. 31, 2014 in 3 pages.
Official Communication for European Patent Application No. 14158958.0 dated Jun. 3, 2014.
Palmas et al., "An Edge-Bunding Layout for Interactive Parallel Coordinates" 2014 IEEE Pacific Visualization Symposium, pp. 57-64.
Vose et al., "Help File for ModelRisk Version 5," 2007, Vose Software, pp. 349-353. [Uploaded in 2 Parts].
Official Communication for New Zealand Patent Application No. 622473 dated Jun. 19, 2014.
Manske, "File Saving Dialogs," <http://www.mozilla.org/editor/ui_specs/FileSaveDialogs.html>, Jan. 20, 1999, pp. 7.
Johnson, Maggie, "Introduction to YACC and Bison".
Gorr et al., "Crime Hot Spot Forecasting: Modeling and Comparative Evaluation", Grant 98-IJ-CX-K005, May 6, 2002, 37 pages.
Official Communication for European Patent Application No. 15192965.0 dated Mar. 17, 2016.
Apsalar, "Data Powered Mobile Advertising," "Free Mobile App Analytics" and various analytics related screen shots <http://apsalar.com> Printed Jul. 18, 2013 in 8 pages.
Official Communication for Great Britain Patent Application No. 1404499.4 dated Jun. 11, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Morrison et al., "Converting Users to Testers: An Alternative Approach to Load Test Script Creation, Parameterization and Data Corellation," CCSC: Southeastern Conference, JCSC 28, 2, Dec. 2012, pp. 188-196.
Yang et al., "HTML Page Analysis Based on Visual Cues", A129, pp. 859-864, 2001.
Li et al., "Interactive Multimodal Visual Search on Mobile Device," IEEE Transactions on Multimedia, vol. 15, No. 3, Apr. 1, 2013, pp. 594-607.
Official Communication for Netherlands Patent Application No. 2012421 dated Sep. 18, 2015.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Official Communication for European Patent Application No. 14158958.0 dated Apr. 16, 2015.
Official Communication for Great Britain Patent Application No. 1411984.6 dated Dec. 22, 2014.
Official Communication for Australian Patent Application No. 2014210604 dated Jun. 5, 2015.
Official Communication for European Patent Application No. 16182336.4 dated Dec. 23, 2016.
Official Communication for European Patent Application No. 15183721.8 dated Nov. 23, 2015.
Official Communication for European Patent Application No. 15181419.1 dated Sep. 29, 2015.
Official Communication in New Zealand Application No. 627962 dated Aug. 5, 2014.
Official Communication for European Patent Application No. 14158977.0 dated Apr. 16, 2015.
Official Communication for Great Britain Patent Application No. 1404479.6 dated Aug. 12, 2014.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Official Communication for European Patent Application No. 14187739.9 dated Jul. 6, 2015.
Official Communication for European Patent Application No. 15184764.7 dated Dec. 14, 2015.
Griffith, Daniel A., "A Generalized Huff Model," Geographical Analysis, Apr. 1982, vol. 14, No. 2, pp. 135-144.
Official Communication for European Patent Application No. 14197938.5 dated Apr. 28, 2015.
Map of San Jose, CA. Retrieved Oct. 2, 2013 from http://maps.bing.com.
Official Communication for Great Britain Patent Application No. 1404489.5 dated May 21, 2015.
Niepert et al., "A Dynamic Ontology for a Dynamic Reference Work", Joint Conference on Digital Libraries, Jun. 17_22, 2007, Vancouver, British Columbia, Canada, pp. 1-10.
Official Communication for European Patent Application No. 14200246.8 dated May 29, 2015.
Official Communciation for Australian Patent Application No. 2014201506 dated Feb. 27, 2015.
Palantir Technologies, "Palantir Labs—Timeline," Oct. 1, 2010, retrieved from the internet https://www.youtube.com/watch?v=JCgDW5bru9M retrieved on Aug. 19, 2015.
Official Communication for Australian Patent Application No. 2014213553 dated May 7, 2015.
Official Communication in New Zealand Application No. 628840 dated Aug. 28, 2014.

(56) References Cited

OTHER PUBLICATIONS

Official Communication for European Patent Application No. 14158977.0 dated Jun. 10, 2014.
Valentini et al., "Ensembles of Learning Machines", M. Marinaro and R. Tagliaferri (Eds.): Wirn Vietri 2002, LNCS 2486, pp. 3-20.
Anonymous, "BackTult—JD Edwards One World Version Control System," printed Jul. 23, 2007 in 1 page.
Ananiev et al., "The New Modality API," http://web.archiye.org/web/20061211011958/http://jaya.sun.com/deyeloper/technicalArticles/J2SE/Desktop/javase6/modality/ Jan. 21, 2006, pp. 8.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
"Potential Money Laundering Warning Signs," snapshot taken 2003, https://web.archiye.org/web/20030816090055/http:/finsolinc.com/ANTI-MONEY%20LAUNDERING%20TRAINING%20GUIDES.pdf.
Official Communication for Great Britain Application No. 1404457.2 dated Aug. 14, 2014.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Official Communication for Australian Patent Application No. 2014203669 dated May 29, 2015.
Delicious, <http://delicious.com/> as printed May 15, 2014 in 1 page.
Definition "Overlay", downloaded Jan. 22, 2015, 1 page.
Official Communication for Great Britain Patent Application No. 1413935.6 dated Dec. 21, 2015.
Manno et al., "Introducing Collaboration in Single-user Applications through the Centralized Control Architecture," 2010, pp. 10.
Kokossi et al., "D7-Dynamic Ontology Management System (Design)", Information Societies Technology Programme, pp. 1-27.
Official Communication for Netherlands Patent Application No. 2013134 dated Apr. 20, 2015.
Official Communication for European Patent Application No. 14197895.7 dated Apr. 28, 2015.
Wang et al., "Research on a Clustering Data De-Duplication Mechanism Based on Bloom Filter," IEEE 2010, 5 pages.
Pythagoras Communications Ltd., "Microsoft CRM Duplicate Detection," Sep. 13, 2011, https://www.youtube.com/watch?v=j-7Qis0D0Kc.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-c553-ui-20120117/#resizing-amp-overflow retrieved on May 18, 2015.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Official Communication for New Zealand Patent Application No. 622517 dated Apr. 3, 2014.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Official Communication for Great Britain Patent Application No. 1404499.4 dated Sep. 29, 2014.
Keylines.com, "KeyLines Datasheet," Mar. 2014, <http://keylines.com/wp-content/uploads/2014/03/KeyLines-datasheet.pdf> downloaded May 12, 2014 in 2 pages.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Thompson, Mick, "Getting Started with GEO," Getting Started with GEO, Jul. 26, 2011.
Official Communication for European Patent Application No. 14180432.8 dated Jun. 23, 2015.

Official Communication for New Zealand Patent Application No. 628495 dated Aug. 19, 2014.
Umagandhi et al., "Search Query Recommendations Using Hybrid User Profile with Query Logs," International Journal of Computer Applications, vol. 80, No. 10, Oct. 1, 2013, pp. 7-18.
Official Communication for New Zealand Patent Application No. 622513 dated Apr. 3, 2014.
Official Communication for Great Britain Patent Application No. 1404486.1 dated Aug. 27, 2014.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Notice of Acceptance for Australian Patent Application No. 2014203669 dated Jan. 21, 2016.
Official Communication for Great Britain Patent Application No. 1404499.4 dated Aug. 20, 2014.
Official Communication for Great Britain Patent Application No. 1404489.5 dated Oct. 6, 2014.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Hibbert et al., "Prediction of Shopping Behavior Using a Huff Model Within a GIS Framework," Healthy Eating in Context, Mar. 18, 2011, pp. 16.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Symantec Corporation, "E-Security Begins with Sound Security Policies," Announcement Symantec, Jun. 14, 2001.
Official Communication for New Zealand Patent Application No. 622473 dated Mar. 27, 2014.
Google Analytics Official Website—Web Analytics & Reporting, <http://www.google.com/analytics.index.html> Printed Jul. 18, 2013 in 22 pages.
Official Communication for Great Britain Patent Application No. 1408025.3 dated Nov. 6, 2014.
"A First Look: Predicting Market Demand for Food Retail using a Huff Analysis," TRF Policy Solutions, Jul. 2012, pp. 30.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Wikipedia, "Multimap," Jan. 1, 2013, https://en.wikipedia.org/w/index.php?title=Multimap&oldid=530800748.
Piwik—Free Web Analytics Software. <http://piwik.org/> Printed Jul. 19, 2013 in18 pages.
Official Communication for Australian Patent Application No. 2014201511 dated Feb. 27, 2015.
Official Communication for European Patent Application no. 14197879.1 dated Apr. 28, 2015.
Glaab et al., "EnrichNet: Network-Based Gene Set Enrichment Analysis," Bioinformatics 28.18 (2012): pp. i451-i457.
Official Communication for Great Britain Patent Application No. 1404457.2 dated Aug. 14, 2014.
Hansen et al., "Analyzing Social Media Networks with NodeXL: Insights from a Connected World", Chapter 4, pp. 53-67 and Chapter 10, pp. 143-164, published Sep. 2010.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Official Communication for Netherlands Patent Application No. 2012438 dated Sep. 21, 2015.
Official Communication for European Patent Application No. 14199180.2 dated Jun. 22, 2015.
Official Communication for Netherlands Patent Application No. 2012436 dated Nov. 6, 2015.

(56) References Cited

OTHER PUBLICATIONS

Official Communication for New Zealand Patent Application No. 622404 dated Mar. 20, 2014.
Geiger, Jonathan G., "Data Quality Management, the Most Critical Initiative You Can Implement", Data Warehousing, Management and Quality, Paper 098-29, SUGI 29, Intelligent Solutions, Inc., Bounder, CO, pp. 14, accessed Oct. 3, 2013.
Definition "Identify", downloaded Jan. 22, 2015, 1 page.
Official Communication for European Patent Application No. 14180142.3 dated Feb. 6, 2015.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Official Communication for Israel Patent Application No. 198253 dated Nov. 24, 2014.
Official Communication for European Patent Application No. 14159464.8 dated Feb. 18, 2016.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Official Communication for European Patent Application No. 14199182.8 dated Mar. 13, 2015.
Official Communication for Netherlands Patent Application No. 2013306 dated Apr. 24, 2015.
Jelen, Bill, "Excel 2013 in Depth, Video Enhanced Edition," Jan. 25, 2013.
About 80 Minutes, "Palantir in a Number of Parts—Part 6—Graph," Mar. 21, 2013, pp. 1-6, retrieved from the internet.
Localytics—Mobile App Marketing & Analytics, <http://www.localytics.com/> Printed Jul. 18, 2013 in 12 pages.
Hua et al., "A Multi-attribute Data Structure with Parallel Bloom Filters for Network Services", HiPC 2006, LNCS 4297, pp. 277-288, 2006.
Official Communication for European Patent Application No. 16188060.4 dated Feb. 6, 2017.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Official Communication for European Patent Application No. 14158861.6 dated Jun. 16, 2014.
Quest, "Toad for ORACLE 11.6—Guide to Using Toad", pp. 1-162, Sep. 24, 2012.
Official Communication for Australian Patent Application No. 2014210614 dated Jun. 5, 2015.
Capptain—Pilot Your Apps, <http://www.capptain.com> Printed Jul. 18, 2013 in 6 pages.
Palantir, "Kite Data-Integration Process Overview," Palantir Technologies, Inc., Copyright 2010, pp. 48.
Johnson, Steve, "Access 2013 on demand," Access 2013 on Demand, May 9, 2013, Que Publishing.
Official Communication for European Patent Application No. 14159464.8 dated Jul. 31, 2014.
Official Communication for European Patent Application No. 14191540.5 dated May 27, 2015.
Rouse, Margaret, "OLAP Cube," <http://searchdatamanagement.techtarget.com/definition/OLAP-cube>, Apr. 28, 2012.
Goswami, Gautam, "Quite Writly Said!," One Brick at a Time, Aug. 21, 2005, pp. 7.
Conner, Nancy, "Google Apps: the Missing Manual," May 1, 2008, pp. 15.
StatCounter—Free Invisible Web Tracker, Hit Counter and Web Stats, <http://statcounter.com/> Printed Jul. 19, 2013 in 17 pages.
Official Communication for European Patent Application No. 15166137.8 dated Sep. 14, 2015.
Official Communication for European Patent Application No. 14159464.8 dated Aug. 20, 2014.
Official Communication for Netherlands Patent Application No. 2012434 dated Jan. 8, 2016.
Official Communication for European Patent Application No. 15165244.3 dated Aug. 27, 2015.
UserMetrix, <http://usermetrix.com/android-analytics> printed Jul. 18, 2013 in 3 pages.
Official Communication for New Zealand Patent Application No. 628840 dated Aug. 28, 2014.
Official Communication for Great Britain Patent Application No. 1413935.6 dated Jan. 27, 2015.
Official Communication for European Patent Application No. 14159464.8 dated Sep. 22, 2014.
Official Communication for Great Britain Patent Application No. 1404489.5 dated Aug. 27, 2014.
Official Communication for Australian Patent Application No. 2014250678 dated Jun. 17, 2015.
Palantir, https://docs.palantir.com/gotham/3.11.1.0/dataguide/baggage/KiteSchema.xsd printed Apr. 4, 2014 in 4 pages.
Hardesty, "Privacy Challenges: Analysis: It's Surprisingly Easy to Identify Individuals from Credit-Card Metadata," MIT News on Campus and Around the World, MIT News Office.
Official Communication for Netherlands Patent Application No. 2012417 dated Sep. 18, 2015.
Nierman, "Evaluating Structural Similarity in XML Documents", 6 pages, 2002.
Official Communication for European Patent Application No. 14186225.0 dated Feb. 13, 2015.
Cohn, et al., "Semi-supervised clustering with user feedback," Constrained Clustering: Advances in Algorithms, Theory, and Applications 4.1 (2003): 17-32.
Official Communication for Canadian Patent Application No. 2666364 dated Jun. 4, 2012.
"A Word About Banks and the Laundering of Drug Money," Aug. 18, 2012, http://www.golemxiv.co.uk/2012/08/a-word-about-banks-and-the-laundering-of-drug-money/.
Official Communication for Israel Patent Application No. 198253 dated Jan. 12, 2016.
Official Communication for New Zealand Patent Application No. 622389 dated Mar. 20, 2014.
Klemmer et al., "Where Do Web Sites Come From? Capturing and Interacting with Design History," Association for Computing Machinery, CHI 2002, Apr. 20-25, 2002, Minneapolis, MN, pp. 8.
Microsoft Office—Visio, "About connecting shapes," <http://office.microsoft.com/en-us/visio-help/about-connecting-shapes-HP085050369.aspx> printed Aug. 4, 2011 in 6 pages.
Map of San Jose, CA. Retrieved Oct. 2, 2013 from http://maps.yahoo.com.
trak.io, <http://trak.io/> printed Jul. 18, 2013 in 3 pages.
Boyce, Jim, "Microsoft Outlook 2010 Inside Out," Aug. 1, 2010, retrieved from the internet https://capdtron.files.wordpress.com/2013/01/outlook-2010-inside_out.pdf.
Official Communication for Great Britain Patent Application No. 1404486.1 dated May 21, 2015.
Official Communication for New Zealand Patent Application No. 628585 dated Aug. 26, 2014.
Official Communication for European Patent Application No. 14189344.6 dated Feb. 20, 2015.
Official Communication for European Patent Application No. 14199180.2 dated Aug. 31, 2015.
Official Communication for New Zealand Patent Application No. 622497 dated Jun. 19, 2014.
Official Communication for European Patent Application No. 14158977.0 dated Mar. 11, 2016.
Wikipedia, "Federated Database System," Sep. 7, 2013, retrieved from the internet on Jan. 27, 2015 http://en.wikipedia.org/w/index.php?title=Federated_database_system&oldid=571954221.
Gu et al., "Record Linkage: Current Practice and Future Directions," Jan. 15, 2004, pp. 32.
Palantir, "Kite," https://docs.palantir.com/gotham/3.11.1.0/adminreference/datasources.11 printed Aug. 30, 2013 in 2 pages.
Official Communication for New Zealand Patent Application No. 627061 dated Jul. 14, 2014.
Hur et al., "SciMiner: web-based literature mining tool for target identification and functional enrichment analysis," Bioinformatics 25.6 (2009): pp. 838-840.

(56) References Cited

OTHER PUBLICATIONS

Flurry Analytics, <http://www.flurry.com/> Printed Jul. 18, 2013 in 14 pages.
Nivas, Tuli, "Test Harness and Script Design Principles for Automated Testing of non-GUI or Web Based Applications," Performance Lab, Jun. 2011, pp. 30-37.
Huff et al., "Calibrating the Huff Model Using ArcGIS Business Analyst," SSRI, Sep. 2008, pp. 33.
Official Communication for New Zealand Patent Application No. 624557 dated May 14, 2014.
Acklen, Laura, "Absolute Beginner's Guide to Microsoft Word 2003," Dec. 24, 2003, pp. 15-18, 34-41, 308-316.
Official Communication for European Patent Application No. 14200298.9 dated May 13, 2015.
Official Communication for European Patent Application No. 14158958.0 dated Mar. 11, 2016.
TestFlight—Beta Testing on the Fly, <http://testflightapp.com/> Printed Jul. 18, 2013 in 3 pages.
DISTIMO—App Analytics, <http://www.distimo.com/app-analytics> Printed Jul. 18, 2013 in 5 pages.
Kontagent Mobile Analytics, <http://www.kontagent.com/> Printed Jul. 18, 2013 in 9 pages.
Official Communication for European Patent Application No. 14189347.9 dated Mar. 4, 2015.
Official Communication for Australian Patent Application No. 2014201507 dated Feb. 27, 2015.
Chaudhuri et al., "An Overview of Business Intelligence Technology," Communications of the ACM, Aug. 2011, vol. 54, No. 8.
Official Communication for New Zealand Patent Application No. 628161 dated Aug. 25, 2014.
Palantir, "The Repository Element," https://docs.palantir.com/gotham/3.11.1.0/dataguide/kite_config_file.04 printed Aug. 30, 2013 in 2 pages.
Huff, David L., "Parameter Estimation in the Huff Model," SSRI, ArcUser, Oct.-Dec. 2003, pp. 34-36.
Palantir, "Kite Operations," Palantir Technologies, Inc., Copyright 2010, p. 1.
Official Communication for European Patent Application No. 15155845.9 dated Oct. 6, 2015.
Palantir, https://docs.palantir.com/gotham/3.11.1.0/dataguide/baggage/KiteSchema printed Aug. 30, 2013 in 1 page.
"Refresh CSS Ellipsis When Resizing Container—Stack Overflow," Jul. 31, 2013, retrieved from internet http://stackoverflow.com/questions/17964681/refresh-css-ellipsis-when-resizing-container.
Bluttman et al., "Excel Formulas and Functions for Dummies," 2005, Wiley Publishing, Inc., pp. 280, 284-286.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Zheng et al., "GOEAST: a web-based software toolkit for Gene Ontology enrichment analysis," Nucleic acids research 36.suppl 2 (2008): pp. W385-W363.
Official Communication for New Zealand Patent Application No. 622497 dated Mar. 26, 2014.
Official Communication for Great Britain Patent Application No. 1404479.6 dated Jul. 9, 2015.
Official Communication for European Patent Application No. 14189802.3 dated May 11, 2015.
Official Communication for Great Britain Patent Application No. 1411984.6 dated Jan. 8, 2016.
Official Communication for European Patent Application No. 14180281.9 dated Jan. 26, 2015.
Map of San Jose, CA. Retrieved Oct. 2, 2013 from http://maps.google.com.
Palantir, "Write a Kite Configuration File in Eclipse," Palantir Technologies, Inc., Copyright 2010, pp. 2.
Countly Mobile Analytics, <http://count.ly/> Printed Jul. 18, 2013 in 9 pages.
Appacts, "Smart Thinking for Super Apps," <http://www.appacts.com> Printed Jul. 18, 2013 in 4 pages.
Sigrist, et al., "PROSITE, a Protein Domain Database for Functional Characterization and Annotation," Nucleic Acids Research, 2010, vol. 38, pp. D161-D166.
Canese et al., "Chapter 2: PubMed: The Bibliographic Database," The NCBI Handbook, Oct. 2002, pp. 1-10.

\* cited by examiner

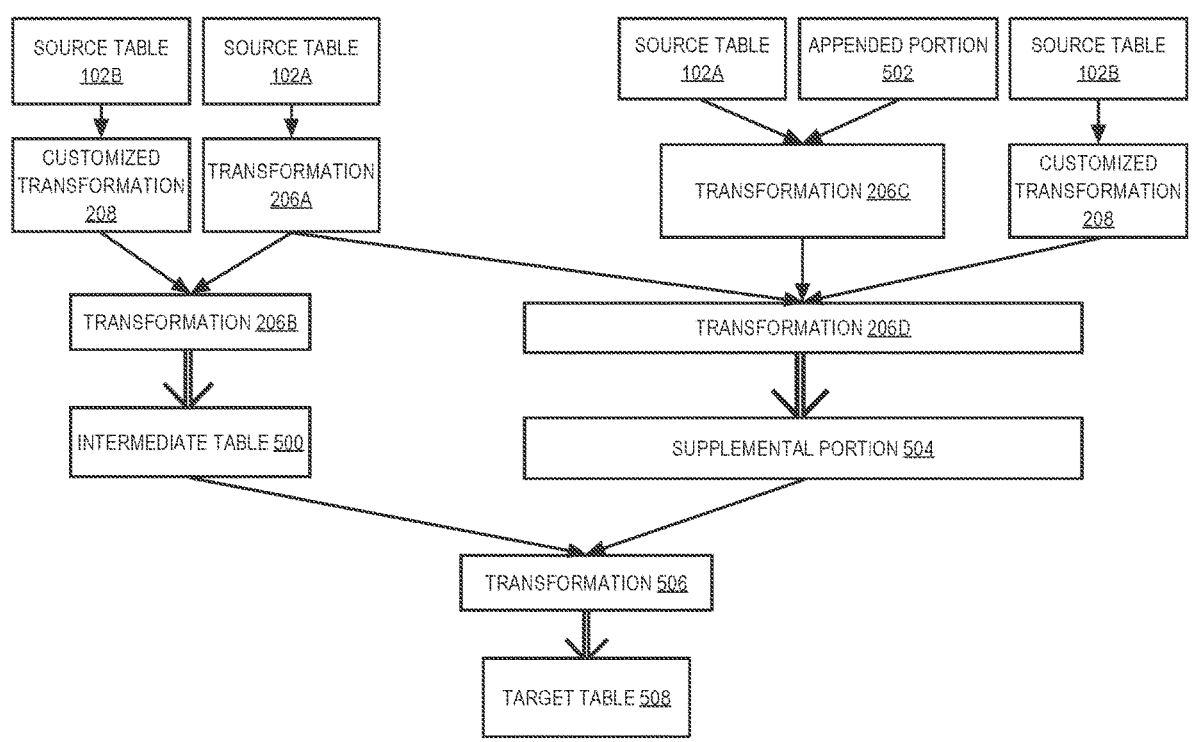

DOMAIN-SPECIFIC LANGUAGE FOR DATASET TRANSFORMATIONS

BENEFIT CLAIM

This application claims the benefit under 35 U.S.C. § 120 as a continuation of application Ser. No. 15/369,753, filed Dec. 5, 2016, which claims the benefit under 35 U.S.C. § 120 as a continuation of application Ser. No. 14/874,690, filed Oct. 5, 2015, which claims the benefit under 35 U.S.C. § 119(e) of provisional application 62/216,192, filed Sep. 9, 2015, the entire contents of which is hereby incorporated by reference as if fully set forth herein.

FIELD OF THE DISCLOSURE

Embodiments relate to database technology and more specifically, to a domain-specific language for dataset transformations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database management system (DBMS) supports generating and modifying stored data. For example, a data definition language (DDL) or a data manipulation language (DML) may be used to interact with a database. However, database interactions may be limited to the basic operations available in the DDL or DML. Furthermore, complex operations written using these basic operations may be error-prone and result in slow processing times.

A DBMS may manage multiple datasets, and data in different datasets are often related by dependencies. Thus, a data change in one dataset may require propagating the data change to another dataset. However, propagating data changes to datasets may involve re-computing an entire dataset. This may tie up computing resources, especially if the data change is relatively small compared to unchanged data.

BRIEF DESCRIPTION OF THE DRAWINGS

In the drawings:

FIGS. 5A-B depict example graphical representations of incremental computation.

Figure 1:
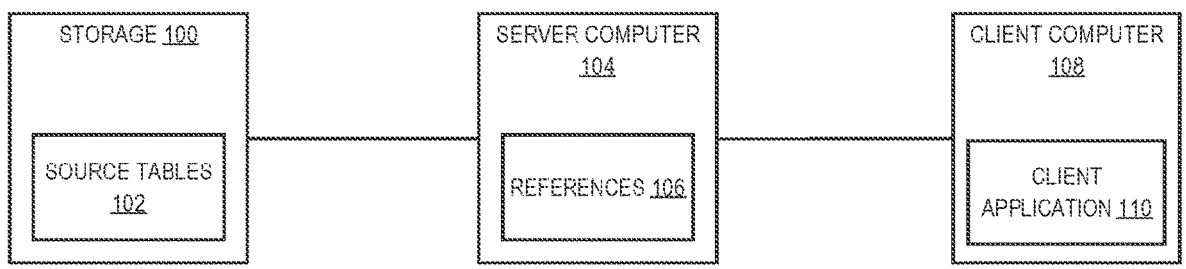
FIG. 1 depicts an example computer architecture on which embodiments may be implemented.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second dataset may be so named although, in reality, it may correspond to a first, second, and/or third dataset.

General Overview

In an embodiment, a domain-specific language (DSL) may interface with an existing DDL and/or DML to offer greater flexibility. For example, the DSL may facilitate generating and/or manipulating datasets stored in volatile and/or non-volatile memory. Datasets may be manipulated based on commands referred to herein as "dataset transformations". Dataset transformations may be created and/or customized by an end user of the DSL. Each dataset transformation may generate an output dataset based on one or more input datasets.

Zero or more dataset transformations may be included in a table definition. The table definition may generate an output table based on zero or more input tables. A sequence for the one or more dataset transformations may be determined based on a graphical representation of the one or more dataset transformations.

The DSL may support efficiently updating tables based on an incremental computation without explicitly invoking the incremental computation. The incremental computation may avoid re-computing a particular table to reflect an update to a dependent table. Instead, the incremental computation may involve performing one or more dataset transformations on a portion of the dependent table that includes the update. The transformed portion may then be incorporated into an older version of the particular table to generate a new version of the particular table that reflects the update.

Example System Environment

FIG. 1 depicts an example computer architecture on which embodiments may be implemented. Referring to FIG. 1, storage computer 100 is communicatively coupled to server computer 104, which is communicatively coupled to client computer 108. Storage 100 includes source tables 102. Server computer 104 includes references 106 to source tables 102. Client computer 108 includes client application 110.

Storage 100 may include one or more database servers, one or more storage devices, and/or one or more of any other system for maintaining source tables 102. For example, storage 100 may be a repository that supports maintaining multiple versions of each source table 102 in such a manner that enables merging changes at any time that is convenient.

Tables (e.g., source tables 102, target tables) may include tabular data that is persisted in storage 100 and/or server computer 104. For example, source tables 102 may be distributed database tables that are stored in a collective non-volatile memory of a cluster of database computers. Tables may be stored in any format, such as JavaScript Object Notation (JSON), Extensible Markup Language (XML), comma-separated values (CSV), a B-tree, and/or a binary encoding.

Server computer 104 may generate tables and/or datasets (e.g., unpersisted data). Server computer 104 may materialize datasets and store them in a volatile memory. Server computer 104 may cause particular datasets to be stored as tables in a non-volatile memory and/or storage 100.

Server computer 104 may include one or more web servers, one or more file servers, and/or one or more of any other interface between storage 100 and client computer 108. Server computer 104 may store copies of tables and/or references 106 to the tables.

References 106 may include pointers, memory addresses, symbolic links, and/or any other indirect reference to a table. Storing references 106 to tables may reduce memory usage and enable data integration in O(1) time.

Storage 100 may be on a separate device from server computer 104. Alternatively, storage 100 may be a persistent storage on server computer 104. Storage 100 and server computer 104 may communicate using a Representational State Transfer (REST) application programming interface (API), a Simple Object Access Protocol (SOAP), and/or any other set of constraints for exchanging information. Source tables 102 in any of a number of different formats may be uploaded to storage 100 and/or server computer 104 based on a plugin that causes source tables 102 to be stored in a common format.

Client application 110 may be a browser, an integrated development environment (IDE), and/or any other user interface. Client application 110 may enable composing a table definition in a DSL. As shall be described in greater detail hereafter, the table definition may include a sequence of one or more dataset transformations to be performed on one or more source tables 102 to generate a target table. The one or more dataset transformations may define the contents of the target table.

The DSL may be independent and different from a DDL and/or a DML used with source tables 102. In other words, server computer 104 may translate between a DSL used with client application 110 and a DDL and/or DML used with source tables 102.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. A computer may be a client and/or a server. Any reference to "a computer" herein may mean one or more computers, unless expressly stated otherwise.

Example Table Definitions

Figure 2:
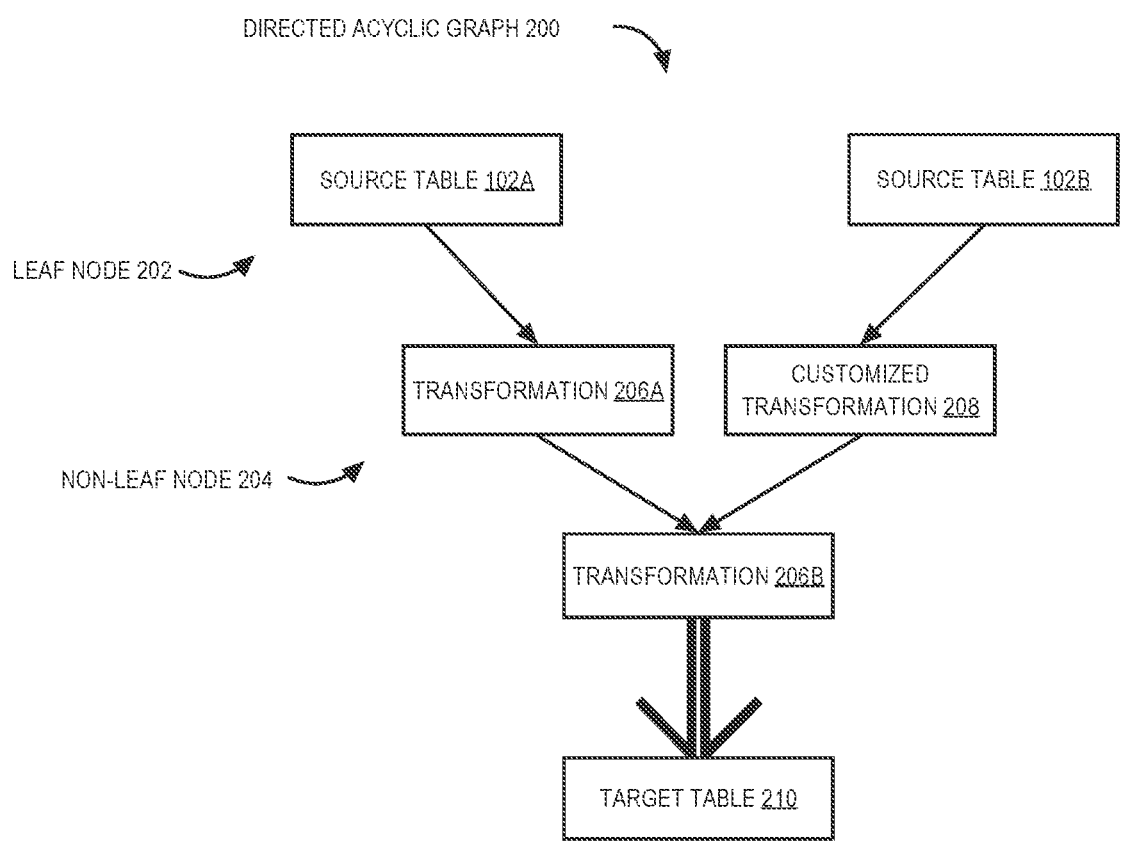
FIG. 2 depicts an example graphical representation of a table definition that includes dataset transformations.

FIG. 2 depicts an example graphical representation of a table definition that includes dataset transformations. Referring to FIG. 2, directed acyclic graph 200 includes leaf node 202 and non-leaf node 204. Leaf node 202 includes source tables 102A-B. Non-leaf node 204 includes transformations 206A-B and customized transformation 208. Target table 210 is generated based on performing transformations 206A-B and customized transformation 208 on source tables 102A-B.

A directed acyclic graph 200 may be a graphical representation of a table definition for a target table 210. The table definition may include one or more dataset transformations (e.g., transformations 206A-B, customized transformation 208) to be performed on one or more source tables 102. The one or more dataset transformations may be represented as verbs, such as "aggregate", "sort", and "drop", that describe an operation that is to be performed in terms of the problem domain instead of how to perform the operation as a sequence of programming language primitives. In other words, table definitions may be composed using declarative programming.

For example, table definition 1 generates target table 210 based on performing transformation 206A on source table 102A.

Table definition 1:

line 1: newTable("target table 210") {
line 2:     startWith "source table 102A"
line 3:     transformation 206A
line 4: }

Line 3 of table definition 1 indicates that transformation 206A is performed. However, in an embodiment, line 3 may indicate that customized transformation 208 is performed. Dataset transformations shall be described in greater detail hereafter.

In the example of FIG. 2, directed acyclic graph 200 may be a graphical representation of table definition 2. Table definition 2 generates target table 210 based on performing transformations 206A-B and customized transformation 208 on source tables 102A-B.

Table definition 2:

line 1: newTable("target table 210") {
line 2:     startWith "source table 102A"
line 3:     transformation 206A
line 4:     transformation 206B [ "dataset" ]
line 5: }
line 6: privateTable("dataset") {
line 7:     startWith "source table 102B"
line 8:     customized transformation 208
line 9: }

Lines 6-9 of table definition 2 appear to be a separate table definition but may operate more like a dataset definition. Typically, "dataset" is materialized but remains unpersisted. In effect, lines 6-9 may be analogous to a Structured Query Language (SQL) CREATE VIEW statement. The dataset resulting from lines 6-9 may be transparent only to table definition 2.

Declarative programming may be used to express the logic of a table definition without describing the control flow of the table definition. Thus, a sequence for the one or more dataset transformations may be determined based on the graphical representation. In the example of FIG. 2, directed acyclic graph 200 indicates that both transformation 206A and customized transformation 208 must be performed prior to transformation 206B. However, transformation 206A and customized transformation 208 may be performed at any time relative to each other.

The directed acyclic graph 200 may include zero or more leaf nodes 202 and zero or more non-leaf nodes 204. The zero or more leaf nodes 202 may represent zero or more tables. In the example of FIG. 2, each leaf node 202 corresponds to a source table 102. In an embodiment, a target table 210 may also be represented by a leaf node 202. Each non-leaf node 204 may represent a dataset transformation.

Example Dataset Transformations

Figure 3:
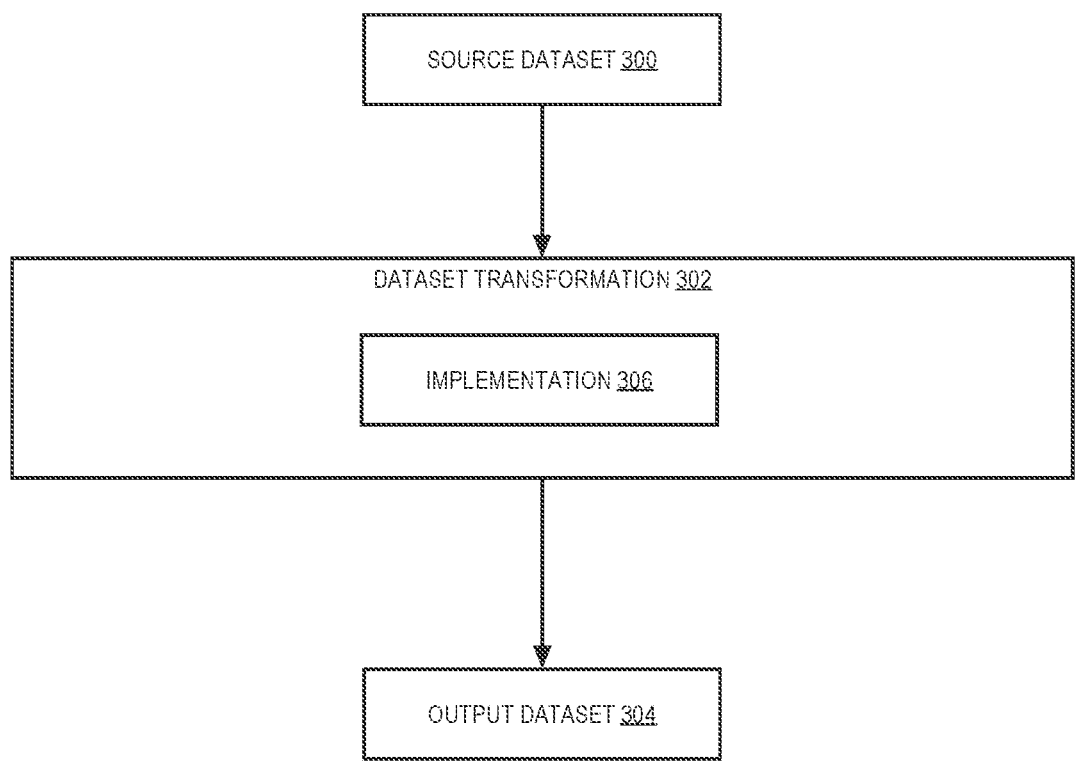
FIG. 3 depicts a detailed view of a dataset transformation, in an example embodiment.

FIG. 3 depicts a detailed view of a dataset transformation, in an example embodiment. Referring to FIG. 3, dataset transformation 302 causes generating output dataset 304 based on an input of source dataset 300. Dataset transformation 302 includes implementation 306.

A dataset (e.g., source dataset 300, output dataset 304) may be a collection of data that is stored in storage 100 and/or server computer 104. Datasets may be stored in a volatile memory and/or persisted in a non-volatile memory. Datasets that are persisted may be called tables.

A dataset that is taken as an input of a dataset transformation 302 is called a source dataset 300, and a dataset that is generated as an output of a dataset transformation 302 is called an output dataset 304. In the example of FIG. 2, source table 102A is a source dataset 300 for transformation 206A, and an output dataset 304 for transformation 206A is a source dataset 300 for transformation 206B. Likewise, source table 102B is a source dataset 300 for customized transformation 208, and an output dataset 304 for customized transformation 208 is a source dataset 300 for transformation 206B. Thus, transformation 206B generates an output dataset 304 based on multiple source datasets 300. The output dataset 304 for transformation 206B becomes target table 210 when it is persisted.

A dataset transformation 302 may be any of a number of operations that are performed on one or more datasets to generate yet another dataset. Each dataset transformation may be associated with an implementation 306 that includes code for causing a particular operation to be performed. As mentioned above, dataset transformations 302 may describe what is to be accomplished without describing how to accomplish it. Thus, an implementation 306 may describe how a dataset transformation 302 is to be performed.

Referring to FIG. 3, dataset transformation 302 may be transformation 206A, transformation 206B, or customized transformation 208 of FIG. 2. Thus, dataset transformation 302 may be an operation that is available in a DSL by default (e.g., transformation 206A-B) or an operation that is defined by an end user of the DSL (e.g., customized transformation 208).

For example, in FIG. 2, source table 102A may represent the following table:

| ID | Major |
|----|-------|
| 1 | Peace Studies |
| 2 | Software Engineering |
| 3 | Computer Engineering |

Transformation 206A may be an operation that filters out non-engineering majors. An implementation 306 of transformation 206A may include a function that compares each string value in a particular column with the string values in an enumerated list and returns a Boolean value. Source table 102A may be a source dataset 300 that is provided as input to transformation 206A to generate an output dataset 304 that represents the following data:

| ID | Major |
|----|-------|
| 2 | Software Engineering |
| 3 | Computer Engineering |

Source table 102B may represent the following table:

| ID | GPA |
|----|-----|
| 1 | 2.0 |
| 2 | 1.7 |
| 3 | 0.9 |
| 4 | 1.5 |

Customized transformation 208 may be an operation that increments numeric values by two. An implementation 306 of customized transformation 208 may include a function that adds two to each numeric value in a particular column. Thus, source table 102B may be a source dataset 300 that is provided as input to customized transformation 208 to generate an output dataset 304 that represents the following data:

| ID | GPA |
|----|-----|
| 1 | 4.0 |
| 2 | 3.7 |
| 3 | 2.9 |
| 4 | 3.5 |

Transformation 206B may be an operation that joins datasets into a composite dataset based on matching values in a respective column of each dataset. An implementation 306 of transformation 206B may include a function that performs an operation similar to a SQL INNER JOIN operation. For example, the output datasets 304 for transformation 206A and customized transformation 208 may be provided as input to transformation 206B to generate an output dataset 304 that represents the following data:

| ID | Major | GPA |
|----|-------|-----|
| 2 | Software Engineering | 3.7 |
| 3 | Computer Engineering | 2.9 |

If this data is persisted, it may be called target table 210.

Example Parallel Computing Optimization

Figure 4:
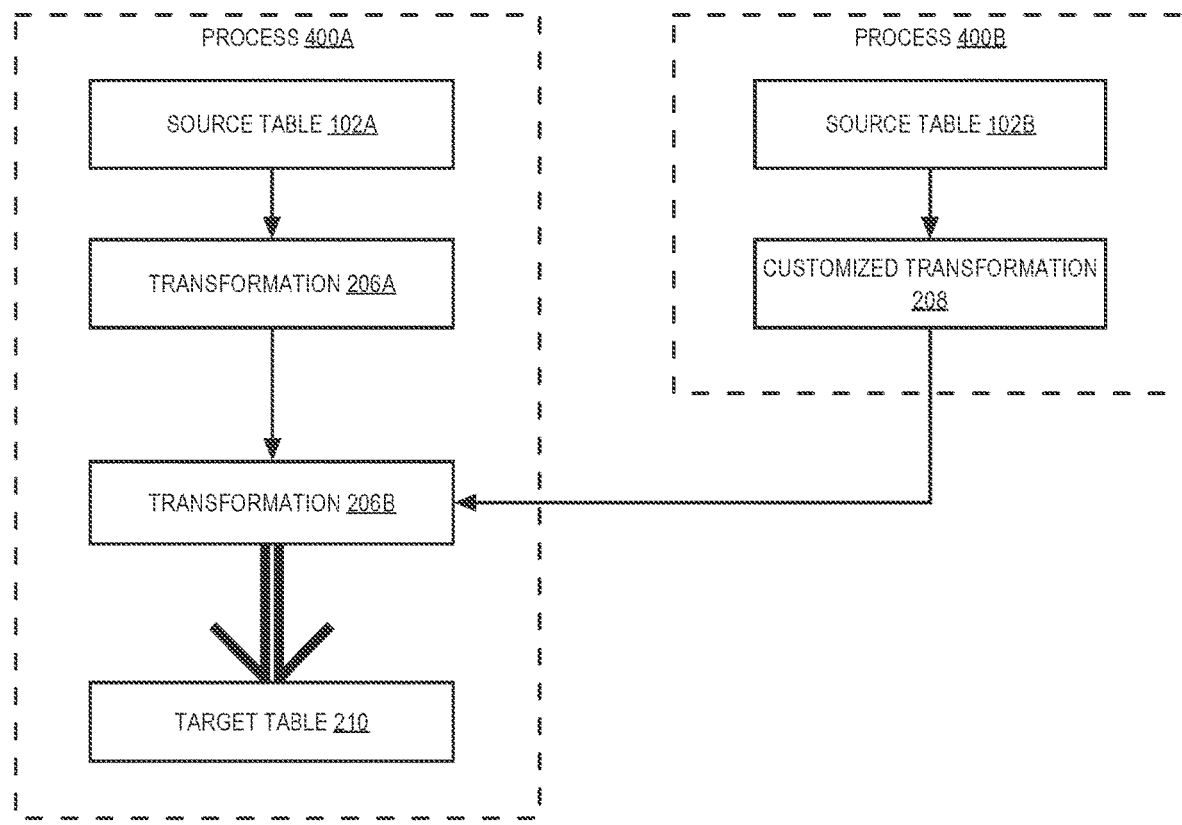
FIG. 4 depicts an example optimization involving parallel computing.

FIG. 4 depicts an example optimization involving parallel computing. Referring to FIG. 4, processes 400A-B perform transformation 206A and customized transformation 208 in parallel to generate target table 210 based on source tables 102A-B.

Processes 400A-B may exist on a single computer or on multiple computers. For example, processes 400A-B may represent different threads on server computer 104 or two different server computers 104.

As mentioned above, a sequence of one or more dataset transformations 302 may be determined based on a graphical representation of the one or more dataset transformations 302. For example, the graphical representation depicted in FIG. 2 may indicate that transformation 206A and customized transformation 208 may be performed concurrently in a multi-threaded application.

Example Incremental Computation Optimization

When a source table 102 is updated with a data change, the data change may be incorporated into a table that depends on the source table 102. However, incorporating the data change may involve completely rebuilding the table that depends on the source table 102. For example, at T1, a particular table may be generated based on performing a particular dataset transformation 302 on a source table 102. At T2, the source table 102 may be updated. Thus, at T3, the particular dataset transformation 302 may be performed on the updated source table 102 to generate an updated version of the particular table.

Completely rebuilding a table may be computationally intensive, especially if updates are frequent. Furthermore, in some situations, completely rebuilding a table may inefficiently incorporate updates. For example, in the example datasets above for FIG. 2, source table 102A may be updated to generate the following table:

| ID | Major |
|---|---|
| 1 | Peace Studies |
| 2 | Software Engineering |
| 3 | Computer Engineering |
| 4 | Electrical Engineering |

Note that the updated source table is generated based on appending the last row to the previous version of source table 102A. In this situation, instead of performing relevant dataset transformations 302 on the updated source table in its entirety, it would be more efficient to perform the relevant dataset transformations 302 on an appended portion (e.g., the last row) of the updated source table. The transformed appended portion may then be combined with the table previously generated based on the previous version of source table 102A. This is called incremental computation.

Figure 5A:
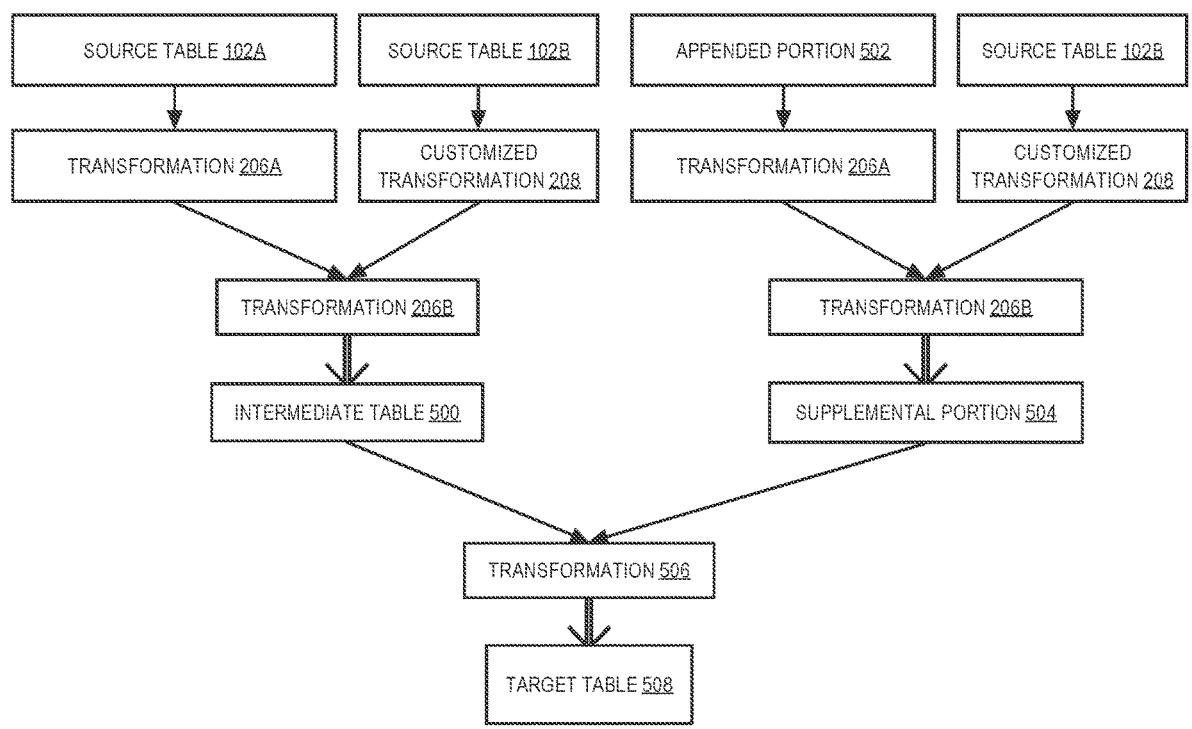

FIGS. 5A-B depict example graphical representations of incremental computation. Referring to FIG. 5A, intermediate table 500 is generated based on performing transformations 206A-B and customized transformation 208 on source tables 102A-B. Supplemental portion 504 is generated based on performing transformations 206A-B and customized transformation 208 on appended portion 502 and source table 102B. However, in an embodiment (e.g., FIG. 5B), supplemental portion 504 may be generated based on performing one or more transformations 206 on source table 102A as well as appended portion 502. Target table 508 is generated based on performing transformation 506 on intermediate table 500 and supplemental portion 504. Note that incremental computation may be an optimization that is performed without an end user specifying transformation 506 and any of the operations used to generate supplemental portion 504.

Intermediate table 500 of FIG. 5A corresponds to target table 210 of FIG. 2. Intermediate table 500 is generated and persisted prior to generating supplemental portion 504. Thus, intermediate table 500 may be retrieved from storage 100 and/or server computer 104 prior to generating target table 508.

In the example of FIG. 5A, appended portion 502 is a portion of an updated source table that was appended to a previous version of source table 102A. Although depicted in the example updated source table above as the last row, appended portion 502 may be data that is added at any of a number of locations. For example, appended portion 502 may be a new first row, a new column, etc.

A supplemental portion 504 may be a portion of an intermediate table 500 that reflects an update to a source table 102. The supplemental portion 504 may be generated based on performing a set of one or more dataset transformations 302 on an appended portion 502 and/or one or more source tables 102. The set of one or more dataset transformations 302 may be similar to that used to generate an intermediate table 500. In FIG. 5A, supplemental portion 504 may represent the following data:

| ID | Major | GPA |
|---|---|---|
| 4 | Electrical Engineering | 3.5 |

Supplemental portion 504 may be a dataset and/or a table.

Transformation 506 may be an operation that combines one dataset with another dataset to generate a composite dataset. In the example of FIG. 5A, intermediate table 500 and supplemental portion 504 are provided as input to transformation 506 to generate an output dataset 304 that represents the following data:

| ID | Major | GPA |
|---|---|---|
| 2 | Software Engineering | 3.7 |
| 3 | Computer Engineering | 2.9 |
| 4 | Electrical Engineering | 3.5 |

If this data is persisted, it may be called target table 508.

Referring to FIG. 5B, transformation 206C may be similar to or different from transformation 206A, and transformation 206D may be similar to or different from transformation 206B. FIG. 5B differs from FIG. 5A in that supplemental portion 504 depends on source table 102A as well as appended portion 502. For example, in FIG. 5B, transformation 206A may be an operation that takes the last two rows of source table 102A. However, appended portion 502 may consist of only one row. Thus, transformation 206C may take as input the last row of source table 102A in addition to appended portion 502.

Approach for Determining Availability of Incremental Computation

Incremental computation may be an optimization that is available for deriving a target table 508 based on one or more criteria. The one or more criteria may include one or more of the following:
an incremental status of a source table 102A
an incremental computability of a dataset transformation 302

Incremental Status of a Source Table

An incremental status of a source table 102A refers to a manner in which an update is incorporated into the source table 102A. An incremental status of "full" indicates that a target table 210 that depends on an updated source table must be completely rebuilt, whereas an incremental status of "incremental" indicates that incremental computation may be used to generate a target table 508 based on the updated source table. For example, a source table 102B without any updates may have an incremental status of "full". Similarly, if an update replaces any data in a source table 102A, the source table 102A may have an incremental status of "full". In contrast, an update that adds data to a source table 102A without replacing any data in the source table 102A may have an incremental status of "incremental".

A target table 508 may be derived based on incremental computation if the target table 508 depends on at least one source table 102A with an incremental status of "incremental". In other words, incremental computation may be available if at least one source table 102A incorporates an update by appending the update.

Incremental Computability of a Dataset Transformation

An incremental computability of a dataset transformation 302 may be categorized as one or more of the following:
 a "concatenate" type
 a "merge and append" type
 a "merge and replace" type
 an "impossible" type A "concatenate" type corresponds to a dataset transformation 302 that can be computed efficiently by appending data to a previous result of the dataset transformation 302 without requiring access to the previous result. For example, a "rename" transformation may correspond to a "concatenate" type, because the "rename" transformation can change the name of a column in an update without accessing a previous renaming of the column.

Like the "concatenate" type, a "merge and append" type corresponds to a dataset transformation 302 that can be computed efficiently by appending data to a previous result of the dataset transformation 302. However, the "merge and append" type requires access to the previous result. For example, a "distinct" transformation may correspond to a "merge and append" type, because the "distinct" transformation removes duplicate rows. Removing duplicate rows in an update cannot be performed confidently without checking for duplicate rows between the update and, for example, the previous result of removing duplicate rows.

A "merge and replace" type corresponds to a dataset transformation 302 that can be computed efficiently by replacing data in a previous result of the dataset transformation 302. Like the "merge and append" type, the "merge and replace" type requires access to the previous result. For example, an "aggregate" transformation consisting of a "sum" operation may correspond to a "merge and replace" type, because the "sum" operation calculates a subtotal for an update, which is then added to a previous total to calculate a new total that replaces the previous total.

An "impossible" type corresponds to a dataset transformation 302 that cannot take advantage of a previous result to perform incremental computation. In other words, the "impossible" type may correspond to a dataset transformation 302 that does not correspond to one of the aforementioned types. For example, an "aggregate" transformation including a "mostFrequentValue" operation may correspond to an "impossible" type, because the statistical mode of a previous result does not necessarily inform the statistical mode of an updated set of data.

Like source tables 102, dataset transformations 302 may be associated with an incremental status. An incremental status of "full" corresponds to a "merge and replace" type of incremental computability. However, an incremental status of "incremental" corresponds to either a "concatenate" type or a "merge and append" type of incremental computability.

A dataset transformation 302 may be associated with multiple types of incremental computability based on one or more dependencies of the dataset transformation 302. The one or more dependencies may include source tables 102 and/or other dataset transformations that provide input to the dataset transformation 302. For example, a dataset transformation 302 with two dependencies may correspond to a "concatenate" type if the first dependency has an incremental status of "incremental", a "merge and append" type if the second dependency has an incremental status of "incremental", and an "impossible" type if each dependency has an incremental status of "incremental".

Furthermore, a dependency of a dataset transformation 302 may be characterized as "reversible" if the dependency can be reconstructed from an output of the dataset transformation 302. In other words, a reversible dependency may be a dependency that can be derived based on performing an inverse dataset transformation on an output dataset 304. For example, a source dataset 300 of a dataset transformation 302 that adds one to particular values is "reversible", because an output dataset 304 of the dataset transformation 302 can be subjected to an inverse operation that subtracts one from the particular values to derive the source dataset 300.

In an embodiment, incremental computation may be available if both of the following criteria are satisfied:
 Each dataset transformation 302 with at least one dependency that has an incremental status of "incremental" corresponds to a "concatenate" type, a "merge and append" type, and/or a "merge and replace" type of incremental computability.
 Each dependency that is and/or depends on a dataset transformation 302 corresponding to a "merge and append" type and/or a "merge and replace" type of incremental computability is a reversible dependency.

Example Incremental Computation Analysis

In the example of FIG. 5A, source table 102A has an incremental status of "incremental", and source table 102B has an incremental status of "full". Since source table 102A is a dependency of transformation 206A, the incremental computability of transformation 206A must be assessed. Thus, in order for target table 508 to be generated based on incremental computation, transformation 206A must correspond to a "concatenate" type, a "merge and append" type, and/or a "merge and replace" type of incremental computability.

Transformation 206A may be an operation that filters out non-engineering majors. Since two portions of a dataset can be filtered independently and then combined to yield the same result as filtering the dataset in its entirety, transformation 206A corresponds to a "concatenate" type of incremental computability. Furthermore, since a dataset transformation 302 corresponding to a "concatenate" type is a dependency that has an incremental status of "incremental," transformation 206A has an incremental status of "incremental". Thus, in order for target table 508 to be generated based on incremental computation, the incremental computability of transformation 206B must also be assessed.

Transformation 206B may be analogous to a SQL INNER JOIN operation. Since performing transformation 206B on a dataset in its entirety yields the same result as combining two portions of the dataset upon which transformation 206B has been performed separately, transformation 206B corresponds to a "concatenate" type of incremental computability.

Note that transformation 506 is irrelevant to determining whether target table 508 can be generated based on incremental computation, because transformation 506 will become part of the implementation of incremental computation once it is determined to be appropriate. In other words, only the dataset transformations 302 depicted in FIG. 2 are relevant to the incremental computation analysis.

As a result of the foregoing incremental computation analysis, server computer 104 may determine that target table 508 can be generated using incremental computation. Server computer 104 may be configured to perform incremental computation whenever server computer 104 determines that incremental computation is available.

Approach for Executing a Table Definition

Figure 6:
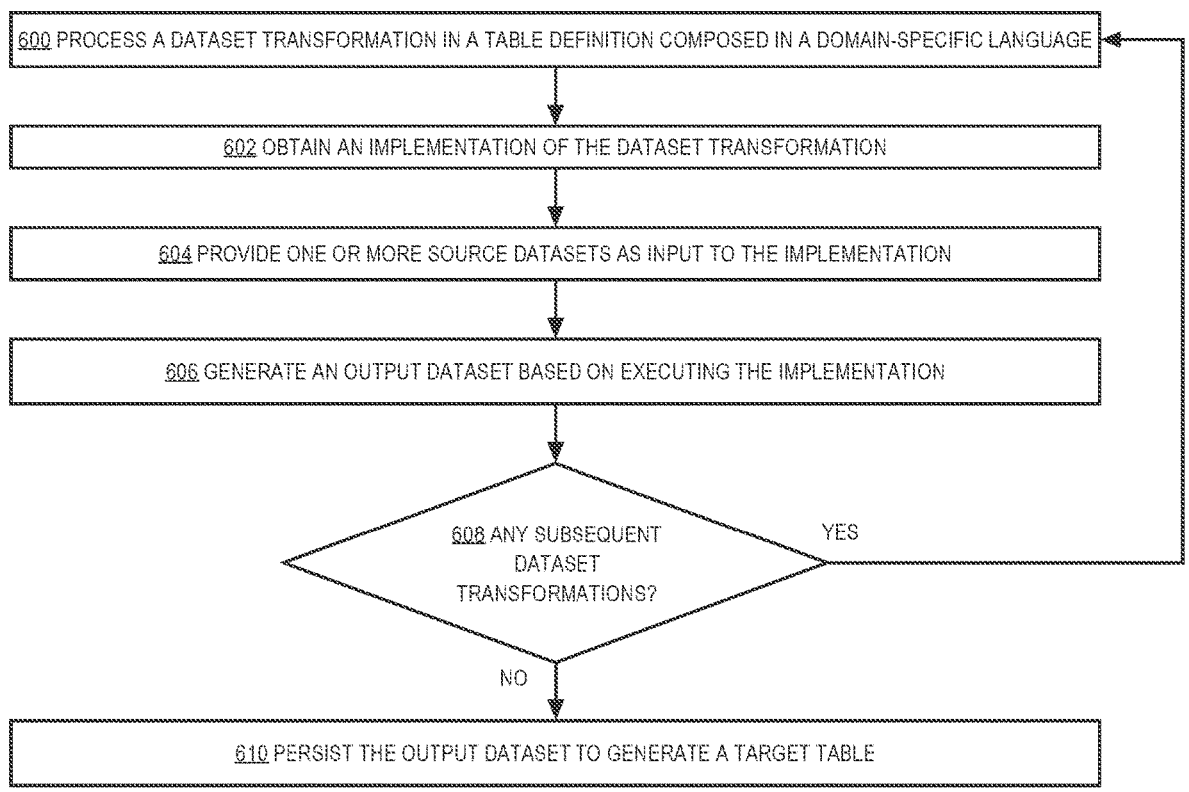
FIG. 6 is a flow diagram that depicts an approach for executing a table definition.

FIG. 6 is a flow diagram that depicts an approach for executing a table definition. At block 600, a server computer 104 may process a dataset transformation 302. The dataset transformation 302 may be included in a table definition that was received from a client computer 108. The table definition may be composed in a DSL. The DSL may be specialized for expressing dataset transformations 302 using declarative programming.

At block 602, the server computer 104 may obtain an implementation 306 of the dataset transformation 302. The table definition may exclude the implementation 306 to facilitate manipulating data. The implementation 306 may be obtained from a separate file at the server computer 104.

At block 604, the server computer 104 may provide the implementation 306 with one or more source datasets 300 as input. The one or more source datasets 300 may be retrieved from a storage 100 and/or from the server computer 104. For example, the server computer 104 may rebuild a source dataset 300 that was previously retrieved from a storage 100 but subsequently removed from a volatile memory due to a failure. Rebuilding lost datasets may be based on logs maintained by the server computer 104 that record a lineage (e.g., a table definition, source datasets 300, dataset transformations 302) of a lost dataset.

At block 606, the server computer 104 may generate an output dataset 304 based on executing the implementation 306. The output dataset 304 may be a transformed source dataset and/or a composite of multiple source datasets 300. The output dataset 304 may be stored in volatile memory.

At block 608, the server computer 104 may determine whether the table definition includes any subsequent dataset transformations 302. A subsequent dataset transformation 302 may be determined based on a graphical representation of the table definition. If the table definition includes any subsequent dataset transformations 302, the output dataset 304 may be used as a source dataset 300 for an immediately subsequent dataset transformation 302. Processing the immediately subsequent dataset transformation 302 may involve a process (not shown) similar to repeating blocks 600-606. However, if the table definition fails to include any subsequent dataset transformations 302, block 608 may proceed to block 610.

At block 610, the server computer 104 may generate a target table 210, 508 based on persisting the output dataset 304. The target table 210, 508 may be stored at server computer 104 and/or storage 100.

Approach for Performing Incremental Computation

Figure 7:
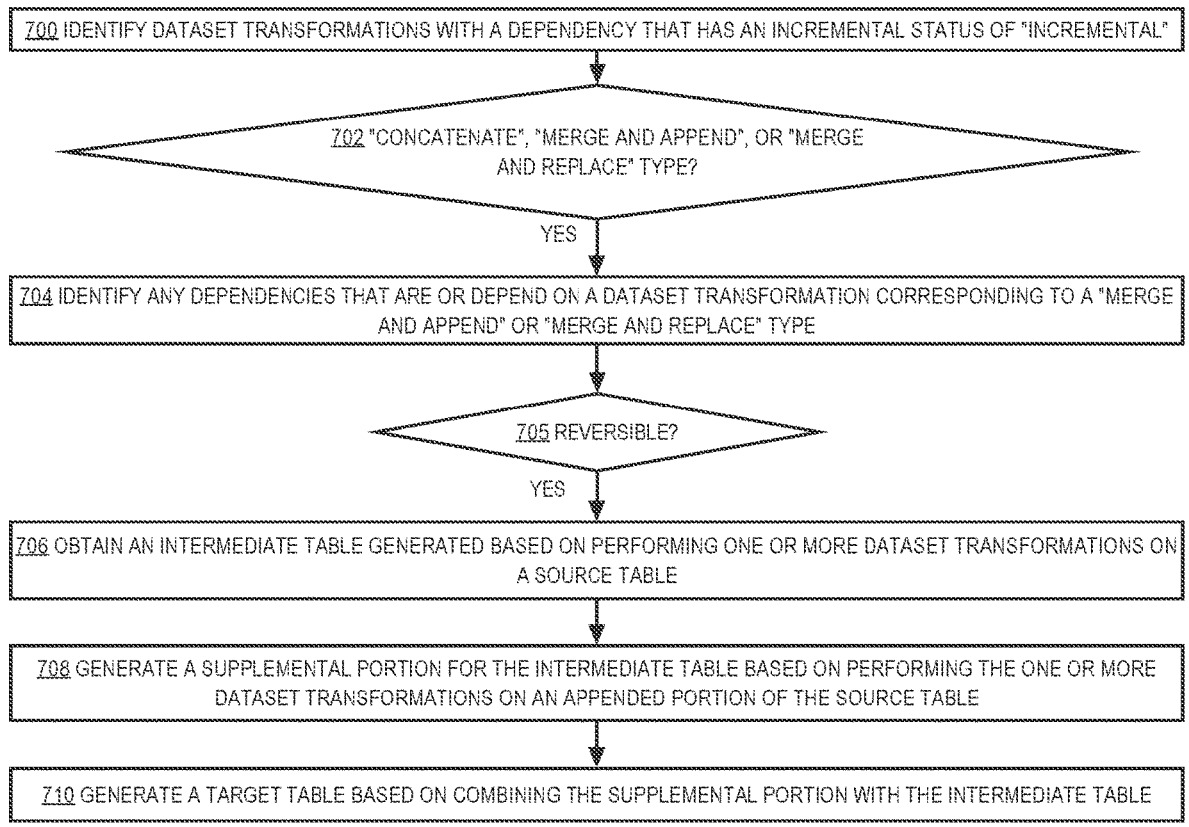
FIG. 7 is a flow diagram that depicts an approach for performing incremental computation.

FIG. 7 is a flow diagram that depicts an approach for performing incremental computation. At block 700, a server computer 104 may identify dataset transformations 302 with a dependency that has an incremental status of "incremental". In other words, the server computer 104 may determine whether one or more source tables 102 were updated based on appending (e.g., adding without replacing) data. Furthermore, the server computer 104 may identify any dataset transformations 302 that depend directly or indirectly on the one or more source tables 102 and determine whether any dataset transformations 302 have an incremental status of "incremental". Thus, block 700 may be performed concurrently with block 702.

At block 702, the server computer 104 may determine whether each dataset transformation 302 identified at block 700 corresponds to a "concatenate" type, a "merge and append" type, and/or a "merge and replace" type of incremental computability. If each dataset transformation 302 is determined to correspond to an incremental computability type other than an "impossible" type, block 702 proceeds to block 704. Otherwise, the incremental computation analysis ends and incremental computation is determined to be unavailable.

At block 704, the server computer 104 may identify any dependencies that are or depend on a dataset transformation corresponding to a "merge and append" type and/or a "merge and replace" type. Incremental computation may still be available if such dependencies are reversible.

At block 705, the server computer 104 may determine whether each dependency identified at block 704 is reversible. If any of the identified dependencies is not reversible, the incremental computation analysis ends and incremental computation is determined to be unavailable. Otherwise, block 705 proceeds to block 706.

At block 706, the server computer 104 may obtain an intermediate table 500 generated based on performing one or more dataset transformations 302 on a source table 102. Although depicted in FIG. 7 as being performed after block 700, block 706 may be performed prior to block 700, after block 708, or at any other suitable time. For example, block 706 of FIG. 7 may correspond to block 610 of FIG. 6.

At block 708, the server computer 104 may generate a supplemental portion 504 for the intermediate table 500 based on performing the one or more dataset transformations 302 on at least an appended portion 502 of the source table 102. In an embodiment, the one or more dataset transformations 302 may also be performed on the source table 102.

At block 710, the server computer 104 may generate a target table 210, 508 based on combining the supplemental portion 504 with the intermediate table 500. Combining the supplemental portion 504 with the intermediate table 500 may involve performing a dataset transformation 302 on the supplemental portion 504 and the intermediate table 500. For example, combining the supplemental portion 504 with the intermediate table 500 may involve performing a square root operation to derive subtotals for the supplemental portion 504 and the intermediate table 500, adding the subtotals to derive a total, and squaring the total. An output dataset 304 of the dataset transformation 302 may be persisted to generate the target table 210, 508.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
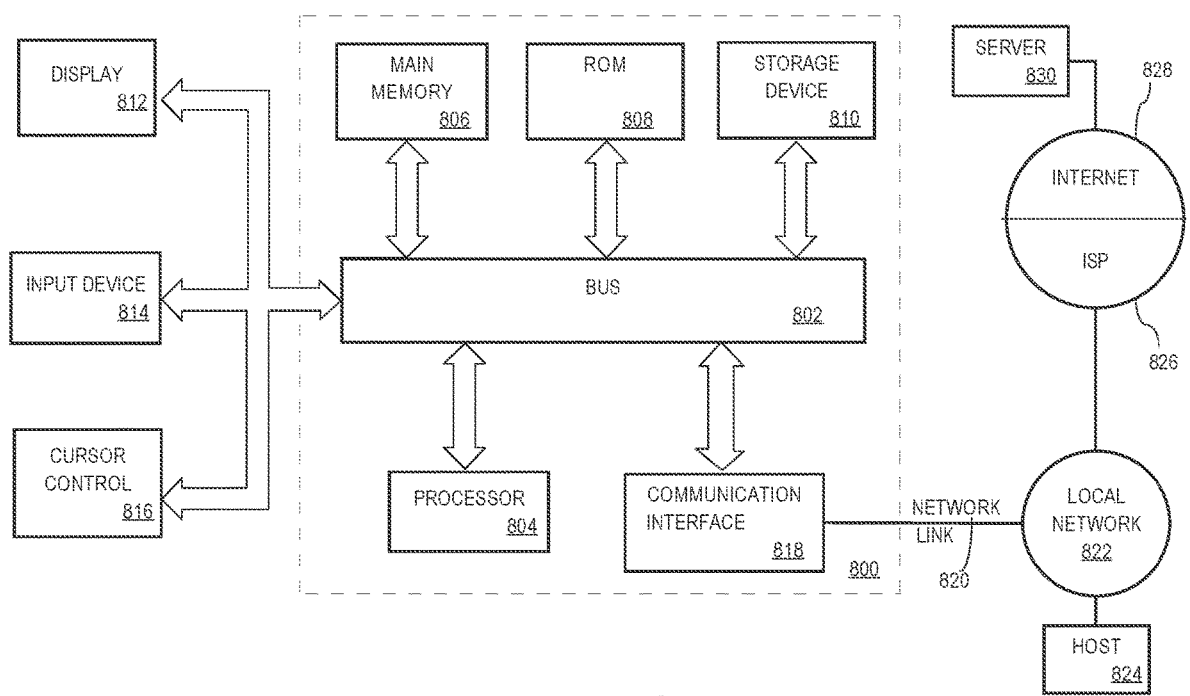
FIG. 8 depicts a computer system upon which an embodiment may be implemented.

For example, FIG. 8 is a block diagram that depicts a computer system 800 upon which an embodiment may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A data processing method comprising:
   retrieving an intermediate table that was generated based in part on performing a first transformation of one or more transformations on a version of a particular source table, wherein the one or more transformations are performable on one or more source tables to generate a target table;
   generating a supplemental portion for the intermediate table based in part on performing a second transformation on an appended portion of an updated version of the particular source table;
   generating the target table based in part on performing a third transformation on the intermediate table and the supplemental portion for the intermediate table,
   wherein the method is performed by one or more computing devices.

2. The method of claim 1, wherein the first transformation and the second transformation are each dataset transformations and are different dataset transformations.

3. The method of claim 1, wherein the second transformation and the third transformation are performed without being specified by an end user.

4. The method of claim 1, wherein generating the supplemental portion comprises performing a fourth transformation on an output dataset of the first transformation and an output dataset of the second transformation.

5. The method of claim 4, wherein the fourth transformation is reversible.

6. The method of claim 1, wherein the target table is generated based on persisting an output dataset of the third transformation.

7. The method of claim 1, wherein a sequence of one or more transformations is determined based on a graphical representation of the one or more transformations.

8. The method of claim 7, wherein the graphical representation is a directed acyclic graph.

9. The method of claim 7, wherein the graphical representation comprises one or more leaf nodes and one or more non-leaf nodes, the one or more leaf nodes representing one or more tables, the one or more non-leaf nodes representing the one or more transformations.

10. The method of claim 1, wherein one or more references to the one or more source tables are stored at a server computer, without copies of the one or more source tables being stored at the server computer.

11. A computer system comprising:
    one or more processors;
    one or more non-transitory data storage media coupled to the one or more processors and storing instructions which, when executed by the one or more processors, cause:
       retrieving an intermediate table that was generated based on performing a first transformation of one or more transformations on a version of a particular source table, wherein the one or more transformations are performable on one or more source tables to generate a target table;
       generating a supplemental portion for the intermediate table based in part on performing a second transformation on an appended portion of an updated version of the particular source table;
       generating the target table based in part on performing a third transformation on the intermediate table and the supplemental portion for the intermediate table.

12. The system of claim 11, wherein the first transformation and the second transformation are each dataset transformations and are different dataset transformations.

13. The system of claim 11, wherein the one or more storage media further comprise sequences of instructions which when executed cause performing the second transformation and the third transformation without being specified by an end user.

14. The system of claim 11, wherein the one or more storage media further comprise sequences of instructions which when executed cause performing generating the supplemental portion by performing a fourth transformation on an output dataset of the first transformation and an output dataset of the second transformation.

15. The system of claim 14, wherein the fourth transformation is reversible.

16. The system of claim 11, wherein the one or more storage media further comprise sequences of instructions which when executed cause generating the target table based on persisting an output dataset of the third transformation.

17. The system of claim 11, wherein the one or more storage media further comprise sequences of instructions which when executed cause determining a sequence of one or more transformations based on a graphical representation of the one or more transformations.

18. The system of claim 17, wherein the graphical representation is a directed acyclic graph.

19. The system of claim 17, wherein the graphical representation comprises one or more leaf nodes and one or more non-leaf nodes, the one or more leaf nodes representing one or more tables, the one or more non-leaf nodes representing the one or more transformations.

20. The system of claim 11, wherein the one or more storage media further comprise sequences of instructions which when executed cause storing one or more references to the one or more source tables at a server computer, without corresponding copies of the one or more source tables being stored at the server computer.

* * * * *